US012199872B2

(12) United States Patent
Erman et al.

(10) Patent No.: US 12,199,872 B2
(45) Date of Patent: Jan. 14, 2025

(54) PROTOCOL AGNOSTIC COGNITIVE CONGESTION CONTROL

(71) Applicant: Nokia Solutions and Networks Oy, Espoo (FI)

(72) Inventors: Bilgehan Erman, Weehawken, NJ (US); Ejder Bastug, Paris (FR); Bruce Cilli, Atlantic Highlands, NJ (US); Andrea Francini, Pittsboro, NC (US); Luoyao Hao, New York, NY (US)

(73) Assignee: Nokia Solutions and Networks Oy, Espoo (FI)

( * ) Notice: Subject to any disclaimer, the term of this patent is extended or adjusted under 35 U.S.C. 154(b) by 204 days.

(21) Appl. No.: 18/083,768

(22) Filed: Dec. 19, 2022

(65) Prior Publication Data

US 2024/0205155 A1   Jun. 20, 2024

(51) Int. Cl.
*H04L 47/12* (2022.01)
*H04L 47/25* (2022.01)
(Continued)

(52) U.S. Cl.
CPC .............. *H04L 47/12* (2013.01); *H04L 47/25* (2013.01); *H04L 47/50* (2013.01); *H04L 69/321* (2013.01); *H04L 69/325* (2013.01)

(58) Field of Classification Search
None
See application file for complete search history.

(56) References Cited

U.S. PATENT DOCUMENTS

| 7,706,345 B2* | 4/2010 | Meier | G06Q 20/3674 |
| | | | 455/418 |
| 10,230,681 B2* | 3/2019 | Ge | H04L 51/56 |

(Continued)

FOREIGN PATENT DOCUMENTS

WO   2012058320 A1   5/2012

OTHER PUBLICATIONS

Lorincz, Josip, Zvonimir Klarin, and Julije Ožegović, "A Comprehensive Overview of TCP Congestion Control in 5G Networks: Research Challenges and Future Perspectives," Sensors 21.13 (2021): 4510; pp. 41.

(Continued)

*Primary Examiner* — Quang N Nguyen
(74) *Attorney, Agent, or Firm* — Tong, Rea, Bentley & Kim, LLC

(57) ABSTRACT

Various example embodiments for supporting congestion control in a communication network are presented. Various example embodiments for supporting congestion control in a communication network may be configured to support protocol agnostic cognitive congestion control in the communication network. Various example embodiments for supporting protocol agnostic cognitive congestion control in a communication network may be configured to support protocol agnostic cognitive congestion control in the communication network by enabling a sending node of a path over which a set of flows is to be communicated to determine the minimum target transmission rate among the links along the path over which the flows are to be communicated and to use the minimum target transmission rate among the links along the path over which flows are to be communicated in order to control transmission of packets over the path at Layer 3 of the Open Systems Interconnection (OSI) model.

17 Claims, 12 Drawing Sheets

(51) Int. Cl.
*H04L 47/50* (2022.01)
*H04L 69/321* (2022.01)
*H04L 69/325* (2022.01)

(56) References Cited

U.S. PATENT DOCUMENTS

| | | | |
|---|---|---|---|
| 11,575,579 B2 * | 2/2023 | Gill | H04L 41/122 |
| 11,855,850 B2 * | 12/2023 | Gill | H04L 41/0893 |
| 2005/0128951 A1 | 6/2005 | Chawla et al. | |
| 2021/0135988 A1 | 5/2021 | Erman et al. | |

OTHER PUBLICATIONS

Fabio M. Chiussi, Ambalavanar Arulambalam, Ye Xia and Xiaoqiang Chen, "Explicit Rate ABR Schemes Using Traffic Load as Congestion Indicator," Bell Laboratories, Lucent Technologies, Holmdel, NJ 07733, USA; Aug. 13, 1997, pp. 9.

J. Iyengar, Ed., M. Thomson, Ed., "QUIC: A UDP-Based Multiplexed and Secure Transport," IETF, RFC 9000, ISSN 2070-1721, May 2021; pp. 151.

S. Deering, R. Hinden, "Internet Protocol, Version 6 (IPv6) Specification," IETF, RFC 8200, ISSN 2070-1721, Jul. 2017; pp. 42. https://datatracker.ietf.org/doc/html/rfc8200.

Dordal, Peter Lors, "8.6: IPV6 Extension Headers," LibreTexts, printed on Apr. 18, 2024; pp. 3. https://eng.libretexts.org/Bookshelves/Computer_Science/Networks/Book%3A_An_Introduction_to_Computer_Networks_(Dordal)/08%3A_IP_version_6/8.06%3A_IPv6_Extension_Headers.

S. Floyd, M. Allman, A. Jain, P. Sarolahti, "Quick-Start for TCP and IP," IETF, RFC 4782, ICIR, F5 Networks, Nokia Research Center; Jan. 2007, pp. 82. https://datatracker.ietf.org/doc/html/rfc4782.

IETF, RFC 3168, "The Addition of Explicit Congestion Notification (ECN) to IP," Sep. 2001; pp. 63.

Mohammad Alizadeh, Albert Greenberg, David A. Maltz, Jitendra Padhye, Parveen Patel, Balaji Prabhakar, Sudipta Sengupta, Murari Sridharan, "Data Center TCP (DCTCP)," ACM SIGCOMM Conference, Microsoft Research, Stanford University; 2010, pp. 63-74.

I. Rhee, L. Xu, S. Ha, A. Zimmermann, L. Eggert, R. Scheffenegger, "CUBIC for Fast Long-Distance Networks," IETF, RFC 8312, ISSN 2070-1721, Feb. 2018; pp. 18.

Neal Cardwell, Yuchung Cheng, C. Stephen Gunn, Soheil Hassas Yeganeh, Van Jacobson, "BBR: Congestion-Based Congestion Control," Communications of the ACM, 60(2), 2017; pp. 55-86.

The ATM Forum, "The ATM Forum Technical Committee; Traffic Management Specification Version 4.0," Apr. 1996; pp. 108.

Extended European Search Report, Application No. 23213430.4-1213, Mar. 4, 2024; pp. 9.

* cited by examiner

PROTOCOL AGNOSTIC COGNITIVE CONGESTION CONTROL

TECHNICAL FIELD

Various example embodiments relate generally to communication systems and, more particularly but not exclusively, to congestion control in communication systems.

BACKGROUND

In communication networks, various communications technologies may be used to support various types of communications.

SUMMARY

In at least some example embodiments, an apparatus includes at least one processor and at least one memory including instructions that, when executed by the at least one processor, cause the apparatus to receive, by a layer 3 protocol handler from a layer 4 protocol handler for a flow to be transmitted over a path between a sending node and a receiving node that includes a set of transit nodes, a protocol data unit of the flow and a context key associated with the flow, associate, by the layer 3 protocol handler, the context key with a packet queue storing a set of packets generated based on the protocol data unit, determine, by the layer 3 protocol handler for the context key, a minimum target transmission rate associated with the path for the context key, and send, by the layer 3 protocol handler based on the minimum target transmission rate associated with the path for the context key, the set of packets. In at least some example embodiments, the flow belongs to an application session of an application on the sending node. In at least some example embodiments, the context key uniquely identifies the application session of the application. In at least some example embodiments, the context key is generated by the application. In at least some example embodiments, the context key is generated by the layer 4 protocol handler. In at least some example embodiments, the set of packets is generated by the layer 3 protocol handler from the protocol data unit. In at least some example embodiments, to determine the minimum target transmission rate associated with the path for the context key, the instructions, when executed by the at least one processor, cause the apparatus at least to send, by the layer 3 protocol handler, a request for each of the transit nodes of the path to provide a respective target transmission rate associated with the path for the context key. In at least some example embodiments, to send the request for each of the transit nodes of the path to provide a respective target transmission rate associated with the path for the context key, the instructions, when executed by the at least one processor, cause the apparatus at least to include, by the layer 3 protocol handler within a first packet of the set of packets sent via the path, the context key and an indication of the request for each of the transit nodes of the path to provide the respective target transmission rate associated with the path for the context key. In at least some example embodiments, to determine the minimum target transmission rate associated with the path, the instructions, when executed by the at least one processor, cause the apparatus at least to receive, by the layer 3 protocol handler from a receiving node of the path, a packet including the minimum target transmission rate associated with the path for the context key. In at least some example embodiments, to determine the minimum target transmission rate associated with the path, the instructions, when executed by the at least one processor, cause the apparatus at least to receive, by the layer 3 protocol handler from a receiving node of the path, a packet including the respective target transmission rates provided by the transit nodes of the path and select, by the layer 3 protocol handler from the respective target transmission rates provided by the transit nodes of the path, the minimum target transmission rate associated with the path for the context key.

In at least some example embodiments, a non-transitory computer readable medium includes program instructions that, when executed by an apparatus, cause the apparatus at least to receive, by a layer 3 protocol handler from a layer 4 protocol handler for a flow to be transmitted over a path between a sending node and a receiving node that includes a set of transit nodes, a protocol data unit of the flow and a context key associated with the flow; associate, by the layer 3 protocol handler, the context key with a packet queue storing a set of packets generated based on the protocol data unit, determine, by the layer 3 protocol handler for the context key, a minimum target transmission rate associated with the path for the context key, and send, by the layer 3 protocol handler based on the minimum target transmission rate associated with the path for the context key, the set of packets. In at least some example embodiments, the flow belongs to an application session of an application on the sending node. In at least some example embodiments, the context key uniquely identifies the application session of the application. In at least some example embodiments, the context key is generated by the application. In at least some example embodiments, the context key is generated by the layer 4 protocol handler. In at least some example embodiments, the set of packets is generated by the layer 3 protocol handler from the protocol data unit. In at least some example embodiments, to determine the minimum target transmission rate associated with the path for the context key, the program instructions, when executed by the apparatus, cause the apparatus at least to send, by the layer 3 protocol handler, a request for each of the transit nodes of the path to provide a respective target transmission rate associated with the path for the context key. In at least some example embodiments, to send the request for each of the transit nodes of the path to provide a respective target transmission rate associated with the path for the context key, the program instructions, when executed by the apparatus, cause the apparatus at least to include, by the layer 3 protocol handler within a first packet of the set of packets sent via the path, the context key and an indication of the request for each of the transit nodes of the path to provide the respective target transmission rate associated with the path for the context key. In at least some example embodiments, to determine the minimum target transmission rate associated with the path, the program instructions, when executed by the apparatus, cause the apparatus at least to receive, by the layer 3 protocol handler from a receiving node of the path, a packet including the minimum target transmission rate associated with the path for the context key. In at least some example embodiments, to determine the minimum target transmission rate associated with the path, the program instructions, when executed by the apparatus, cause the apparatus at least to receive, by the layer 3 protocol handler from a receiving node of the path, a packet including the respective target transmission rates provided by the transit nodes of the path and select, by the layer 3 protocol handler from the respective target transmission rates provided by the transit nodes of the path, the minimum target transmission rate associated with the path for the context key.

In at least some example embodiments, a method includes receiving, by a layer 3 protocol handler from a layer 4 protocol handler for a flow to be transmitted over a path between a sending node and a receiving node that includes a set of transit nodes, a protocol data unit of the flow and a context key associated with the flow, associating, by the layer 3 protocol handler, the context key with a packet queue storing a set of packets generated based on the protocol data unit, determining, by the layer 3 protocol handler for the context key, a minimum target transmission rate associated with the path for the context key, and sending, by the layer 3 protocol handler based on the minimum target transmission rate associated with the path for the context key, the set of packets. In at least some example embodiments, the flow belongs to an application session of an application on the sending node. In at least some example embodiments, the context key uniquely identifies the application session of the application. In at least some example embodiments, the context key is generated by the application. In at least some example embodiments, the context key is generated by the layer 4 protocol handler. In at least some example embodiments, the set of packets is generated by the layer 3 protocol handler from the protocol data unit. In at least some example embodiments, determining the minimum target transmission rate associated with the path for the context key includes sending, by the layer 3 protocol handler, a request for each of the transit nodes of the path to provide a respective target transmission rate associated with the path for the context key. In at least some example embodiments, sending the request for each of the transit nodes of the path to provide a respective target transmission rate associated with the path for the context key includes including, by the layer 3 protocol handler within a first packet of the set of packets sent via the path, the context key and an indication of the request for each of the transit nodes of the path to provide the respective target transmission rate associated with the path for the context key. In at least some example embodiments, determining the minimum target transmission rate associated with the path includes receiving, by the layer 3 protocol handler from a receiving node of the path, a packet including the minimum target transmission rate associated with the path for the context key. In at least some example embodiments, determining the minimum target transmission rate associated with the path includes receiving, by the layer 3 protocol handler from a receiving node of the path, a packet including the respective target transmission rates provided by the transit nodes of the path and selecting, by the layer 3 protocol handler from the respective target transmission rates provided by the transit nodes of the path, the minimum target transmission rate associated with the path for the context key.

In at least some example embodiments, an apparatus includes means for receiving, by a layer 3 protocol handler from a layer 4 protocol handler for a flow to be transmitted over a path between a sending node and a receiving node that includes a set of transit nodes, a protocol data unit of the flow and a context key associated with the flow, means for associating, by the layer 3 protocol handler, the context key with a packet queue storing a set of packets generated based on the protocol data unit, means for determining, by the layer 3 protocol handler for the context key, a minimum target transmission rate associated with the path for the context key, and means for sending, by the layer 3 protocol handler based on the minimum target transmission rate associated with the path for the context key, the set of packets. In at least some example embodiments, the flow belongs to an application session of an application on the sending node. In at least some example embodiments, the context key uniquely identifies the application session of the application. In at least some example embodiments, the context key is generated by the application. In at least some example embodiments, the context key is generated by the layer 4 protocol handler. In at least some example embodiments, the set of packets is generated by the layer 3 protocol handler from the protocol data unit. In at least some example embodiments, the means for determining the minimum target transmission rate associated with the path for the context key includes means for sending, by the layer 3 protocol handler, a request for each of the transit nodes of the path to provide a respective target transmission rate associated with the path for the context key. In at least some example embodiments, the means for sending the request for each of the transit nodes of the path to provide a respective target transmission rate associated with the path for the context key includes means for including, by the layer 3 protocol handler within a first packet of the set of packets sent via the path, the context key and an indication of the request for each of the transit nodes of the path to provide the respective target transmission rate associated with the path for the context key. In at least some example embodiments, the means for determining the minimum target transmission rate associated with the path includes means for receiving, by the layer 3 protocol handler from a receiving node of the path, a packet including the minimum target transmission rate associated with the path for the context key. In at least some example embodiments, the means for determining the minimum target transmission rate associated with the path includes means for receiving, by the layer 3 protocol handler from a receiving node of the path, a packet including the respective target transmission rates provided by the transit nodes of the path and means for selecting, by the layer 3 protocol handler from the respective target transmission rates provided by the transit nodes of the path, the minimum target transmission rate associated with the path for the context key.

In at least some example embodiments, an apparatus includes at least one processor and at least one memory including instructions that, when executed by the at least one processor, cause the apparatus to receive, by a transit node from a sending node, a packet intended for delivery to a receiving node over a path from the sending node to the receiving node that includes an egress interface of the transit node, wherein the packet includes a context key and an indication of a request by the sending node for the transit node to provide a target transmission rate for the context key, determine, by the transit node in response to the indication of the request by the sending node for the transit node to provide the target transmission rate for the context key and based on measurements of traffic on the egress interface of the transit node, the target transmission rate for the context key, insert, by the transit node, the target transmission rate for the context key into the packet to form a modified packet, and send, by the transit node toward the receiving node via the egress interface of the transit node, the modified packet. In at least some example embodiments, the target transmission rate is indicative of a prediction by the transit node that, when the sending node sends a set of flows associated with the context key at the target transmission rate, buffer delays encountered by the flows at the transit node are not expected to exceed a target buffering delay. In at least some example embodiments, the target transmission rate for the context key is determined based on a determination that a utilization of a set of egress queues satisfies a target utilization. In at least some example embodiments, the utilization of the set of egress queues is based on a predicted number of active context flows, a predicted average throughput for the context key, the target transmission rate for the context key, and an egress transmission capacity of the egress interface. In at least some example embodiments, the target utilization is determined based on use of a probability distribution function related to a probability that a packet is delayed in the set of egress queues. In at least some example embodiments, the target utilization is determined based on use of at least one function to dynamically compute the target utilization for a given set of criteria for the egress interface of the transit node, wherein the at least one function includes at least one of an artificial intelligence function or a machine learning function.

In at least some example embodiments, a non-transitory computer readable medium includes program instructions that, when executed by an apparatus, cause the apparatus at least to receive, by a transit node from a sending node, a packet intended for delivery to a receiving node over a path from the sending node to the receiving node that includes an egress interface of the transit node, wherein the packet includes a context key and an indication of a request by the sending node for the transit node to provide a target transmission rate for the context key, determine, by the transit node in response to the indication of the request by the sending node for the transit node to provide the target transmission rate for the context key and based on measurements of traffic on the egress interface of the transit node, the target transmission rate for the context key, insert, by the transit node, the target transmission rate for the context key into the packet to form a modified packet, and send, by the transit node toward the receiving node via the egress interface of the transit node, the modified packet. In at least some example embodiments, the target transmission rate is indicative of a prediction by the transit node that, when the sending node sends a set of flows associated with the context key at the target transmission rate, buffer delays encountered by the flows at the transit node are not expected to exceed a target buffering delay. In at least some example embodiments, the target transmission rate for the context key is determined based on a determination that a utilization of a set of egress queues satisfies a target utilization. In at least some example embodiments, the utilization of the set of egress queues is based on a predicted number of active context flows, a predicted average throughput for the context key, the target transmission rate for the context key, and an egress transmission capacity of the egress interface. In at least some example embodiments, the target utilization is determined based on use of a probability distribution function related to a probability that a packet is delayed in the set of egress queues. In at least some example embodiments, the target utilization is determined based on use of at least one function to dynamically compute the target utilization for a given set of criteria for the egress interface of the transit node, wherein the at least one function includes at least one of an artificial intelligence function or a machine learning function.

In at least some example embodiments, a method includes receiving, by a transit node from a sending node, a packet intended for delivery to a receiving node over a path from the sending node to the receiving node that includes an egress interface of the transit node, wherein the packet includes a context key and an indication of a request by the sending node for the transit node to provide a target transmission rate for the context key, determining, by the transit node in response to the indication of the request by the sending node for the transit node to provide the target transmission rate for the context key and based on measurements of traffic on the egress interface of the transit node, the target transmission rate for the context key, inserting, by the transit node, the target transmission rate for the context key into the packet to form a modified packet, and sending, by the transit node toward the receiving node via the egress interface of the transit node, the modified packet. In at least some example embodiments, the target transmission rate is indicative of a prediction by the transit node that, when the sending node sends a set of flows associated with the context key at the target transmission rate, buffer delays encountered by the flows at the transit node are not expected to exceed a target buffering delay. In at least some example embodiments, the target transmission rate for the context key is determined based on a determination that a utilization of a set of egress queues satisfies a target utilization. In at least some example embodiments, the utilization of the set of egress queues is based on a predicted number of active context flows, a predicted average throughput for the context key, the target transmission rate for the context key, and an egress transmission capacity of the egress interface. In at least some example embodiments, the target utilization is determined based on use of a probability distribution function related to a probability that a packet is delayed in the set of egress queues. In at least some example embodiments, the target utilization is determined based on use of at least one function to dynamically compute the target utilization for a given set of criteria for the egress interface of the transit node, wherein the at least one function includes at least one of an artificial intelligence function or a machine learning function.

In at least some example embodiments, an apparatus includes means for receiving, by a transit node from a sending node, a packet intended for delivery to a receiving node over a path from the sending node to the receiving node that includes an egress interface of the transit node, wherein the packet includes a context key and an indication of a request by the sending node for the transit node to provide a target transmission rate for the context key, means for determining, by the transit node in response to the indication of the request by the sending node for the transit node to provide the target transmission rate for the context key and based on measurements of traffic on the egress interface of the transit node, the target transmission rate for the context key, means for inserting, by the transit node, the target transmission rate for the context key into the packet to form a modified packet, and means for sending, by the transit node toward the receiving node via the egress interface of the transit node, the modified packet. In at least some example embodiments, the target transmission rate is indicative of a prediction by the transit node that, when the sending node sends a set of flows associated with the context key at the target transmission rate, buffer delays encountered by the flows at the transit node are not expected to exceed a target buffering delay. In at least some example embodiments, the target transmission rate for the context key is determined based on a determination that a utilization of a set of egress queues satisfies a target utilization. In at least some example embodiments, the utilization of the set of egress queues is based on a predicted number of active context flows, a predicted average throughput for the context key, the target transmission rate for the context key, and an egress transmission capacity of the egress interface. In at least some example embodiments, the target utilization is determined based on use of a probability distribution function related to a probability that a packet is delayed in the set of egress queues. In at least some example embodiments, the target utilization is determined based on use of at least one function to dynamically compute the target utilization for a given set of criteria for the egress interface of the transit node, wherein the at least one function includes at least one of an artificial intelligence function or a machine learning function.

In at least some example embodiments, an apparatus includes at least one processor and at least one memory including instructions that, when executed by the at least one processor, cause the apparatus to receive, by a receiving node of a path between a sending node and the receiving node that includes a set of transit nodes, a first packet that includes a context key and a respective set of target transmission rates of the respective transit nodes for the context key and send, by the receiving node toward the sending node, a second packet including the context key and the set of target transmission rates of the respective transit nodes for the context key. In at least some example embodiments, the first packet is associated with a flow of an application session of an application on the sending node, wherein the context key uniquely identifies the application session of the application. In at least some example embodiments, the first packet includes respective sets of statistical measures provided by the routers for respective egress interfaces of the routers on the path, wherein the second packet includes the respective sets of statistical measures provided by the routers for the respective egress interfaces of the routers on the path.

In at least some example embodiments, a non-transitory computer readable medium includes program instructions that, when executed by an apparatus, cause the apparatus at least to receive, by a receiving node of a path between a sending node and the receiving node that includes a set of transit nodes, a first packet that includes a context key and a respective set of target transmission rates of the respective transit nodes for the context key and send, by the receiving node toward the sending node, a second packet including the context key and the set of target transmission rates of the respective transit nodes for the context key. In at least some example embodiments, the first packet is associated with a flow of an application session of an application on the sending node, wherein the context key uniquely identifies the application session of the application. In at least some example embodiments, the first packet includes respective sets of statistical measures provided by the routers for respective egress interfaces of the routers on the path, wherein the second packet includes the respective sets of statistical measures provided by the routers for the respective egress interfaces of the routers on the path.

In at least some example embodiments, a method includes receiving, by a receiving node of a path between a sending node and the receiving node that includes a set of transit nodes, a first packet that includes a context key and a respective set of target transmission rates of the respective transit nodes for the context key and sending, by the receiving node toward the sending node, a second packet including the context key and the set of target transmission rates of the respective transit nodes for the context key. In at least some example embodiments, the first packet is associated with a flow of an application session of an application on the sending node, wherein the context key uniquely identifies the application session of the application. In at least some example embodiments, the first packet includes respective sets of statistical measures provided by the routers for respective egress interfaces of the routers on the path, wherein the second packet includes the respective sets of statistical measures provided by the routers for the respective egress interfaces of the routers on the path.

In at least some example embodiments, an apparatus includes means for receiving, by a receiving node of a path between a sending node and the receiving node that includes a set of transit nodes, a first packet that includes a context key and a respective set of target transmission rates of the respective transit nodes for the context key and means for sending, by the receiving node toward the sending node, a second packet including the context key and the set of target transmission rates of the respective transit nodes for the context key. In at least some example embodiments, the first packet is associated with a flow of an application session of an application on the sending node, wherein the context key uniquely identifies the application session of the application. In at least some example embodiments, the first packet includes respective sets of statistical measures provided by the routers for respective egress interfaces of the routers on the path, wherein the second packet includes the respective sets of statistical measures provided by the routers for the respective egress interfaces of the routers on the path.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical or similar elements that are common among the various figures.

DETAILED DESCRIPTION

Figure 1:
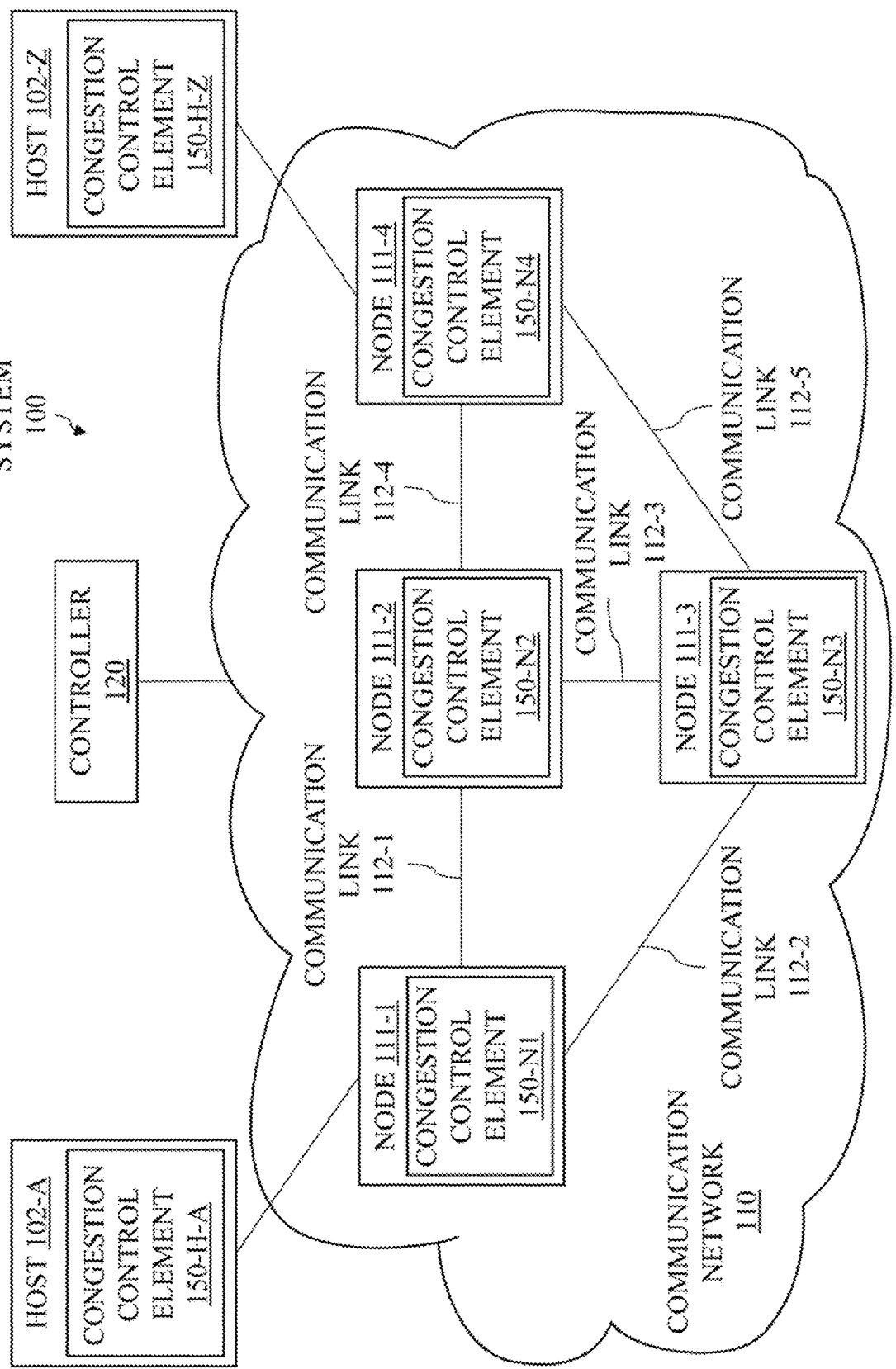
FIG. 1 depicts an example embodiment of a communication system configured to support protocol agnostic cognitive congestion control.

Various example embodiments for supporting congestion control in a communication network are presented herein. Various example embodiments for supporting congestion control in a communication network may be configured to support protocol agnostic cognitive congestion control in the communication network. In at least some instances, example embodiments of protocol agnostic cognitive congestion control may be referred to more generally herein as protocol agnostic congestion control or, more simply, congestion control.

Various example embodiments for supporting protocol agnostic cognitive congestion control in a communication network, within the context of the Open Systems Interconnection (OSI) model, may be configured to support congestion control entirely at the network layer (Layer 3) of the OSI model, thereby obviating the need to use congestion control procedures that rely on a combination of network layer and transport layer (Layer 4) congestion procedures that typically depend on the specific transport layer protocol in use (e.g., Transmission Control Protocol (TCP) and the particular TCP congestion avoidance schemes configured for operation, Stream Control Transmission Protocol (SCTP) and the particular SCTP congestion avoidance schemes configured for operation, QUIC and the particular QUIC congestion avoidance schemes configured for operation, and so forth). It will appreciated that references herein to protocol agnostic cognitive congestion control may be read as references to Layer 3 congestion control which is agnostic of the Layer 4 protocol is use for transporting packets.

Various example embodiments for supporting protocol agnostic cognitive congestion control in a communication network may be configured to support protocol agnostic cognitive congestion control in the communication network by enabling a sending node of a path over which a set of flows is to be communicated to determine the minimum target transmission rate among the links along the path over which the flows are to be communicated and to use the minimum target transmission rate among the links along the path over which flows are to be communicated in order to control transmission of packets over the path at Layer 3 of the OSI model. The minimum target transmission rate of the path is determined by selecting a minimum target transmission rate from a set of target transmission rates determined by the transit nodes of the path (e.g., each transit node/link on the path reports a target transmission rate that, as far as the respective transit node/link is concerned, the sending node should be using for transmitting on that path). The target transmission rates of the transit nodes for the links on the path may be the average rates that should be used by the sending node on the path, the maximum rates that should be used by the sending node on the path, or the like. It will be appreciated that various other example embodiments may be supported.

Various example embodiments for supporting protocol agnostic cognitive congestion control in a communication network may be configured to support determination and use of the minimum target transmission rate for controlling transmission of packets at Layer 3 of the OSI model by enabling the sending node of the path to request and receive target transmission rate information from transit nodes of the path, enabling the transit nodes of the path to compute target transmission rates based on measurement of link condition information and to support delivery of target transmission rate information to the sending node, enabling the receiving node of the path to support handling of transmission rate information from transit nodes of the path and delivery of the target transmission rate information to the sending node of the path, or the like, as well as various combinations thereof. The target transmission rate information may be delivered from the transit nodes of the path to the sending node of the path directly (e.g., by directly responding to respective requests from the sending node of the path), indirectly (e.g., by forwarding target transmission rate information to the receiving node of the path for forwarding to the sending node of the path), or the like, as well as various combinations thereof. It will be appreciated that various other example embodiments may be supported.

It will be appreciated that these and various other example embodiments for supporting congestion control in a communication network, and advantages or potential advantages of example embodiments for supporting congestion control in a communication network, may be further understood by way of reference to the various figures, which are discussed further below.

FIG. 1 depicts an example embodiment of a communication system configured to support protocol agnostic cognitive congestion control.

The communication system 100 includes a pair of hosts 102-A and 102-Z (collectively, hosts 102), a communication network 110, and a controller 120. The communication network 110 may be configured to support communications between the hosts 102. The communication network 110 may be configured to support communications between the hosts 102 using various communication methodologies. The controller 120 may be configured to provide various control functions for the communication network 110. It will be appreciated that the communication system 100, although primarily presented herein as having a specific implementation (e.g., specific types, numbers, and arrangements of elements), may be implemented in various other ways.

The hosts 102 are configured to communicate over the communication network 110. The hosts 102 may include any elements which may communicate over the communication network 110. For example, the hosts 102 may include end user elements (e.g., computers, smartphones, Internet-of-Things (IoT) devices, or the like), network elements (e.g., servers, virtual machines (VMs), network functions, or the like), or the like, as well as various combinations thereof. The hosts 102 may communicate based on various types of applications (e.g., streaming video applications, streaming data sharing applications, multiplayer gaming applications, or the like, as well as various combinations thereof) which may utilize packet flows between the hosts 102 for transporting application content between the hosts 102. The hosts 102 may communicate based on communication protocol stacks based on the OSI model. The hosts 102-A and 102-Z include, respectively, congestion control elements 150-H-A and 150-H-Z (collectively, congestion control elements 150-H), which may be configured to support various example embodiments of congestion control as presented herein (e.g., supporting protocol agnostic cognitive congestion control which supports various aspects of L3 congestion control as presented herein). It will be appreciated that various other types of hosts 102 may communicate over the communication network 110.

The communication network 110 may be configured to support communications using various communications capabilities (e.g., various communication methodologies, various communication protocols, or the like, as well as various combinations thereof). For example, the communication network 110 may support communications based on the OSI model. For example, the communication network 110 may be configured to support communications of various application types. For example, the communication network 110 may be configured to support communications based on various Layer 4 (L4) protocols, including connection-oriented L4 protocols (e.g., TCP, SCTP, QUIC, or the like) and/or connectionless L4 protocols (e.g., User Datagram Protocol (UDP) or the like). For example, the communication network 110 may be configured to support communications based on various Layer 3 protocols (e.g., Internet Protocol (IP) such as IP version 4 (IPv4) or IP version 6 (IPv6) or the like). It will be appreciated that the communication network 110 may be configured to support communications based on various other communication capabilities (e.g., various other communications protocols, various other combinations of communication protocols, or the like, as well as various combinations thereof).

The communication network 110 includes a set of nodes 111-1 to 111-4 (collectively, nodes 111) and a set of communication links 112-1 to 112-5 (collectively, communication links 112). The nodes 111-1 and 111-2 are connected by communication link 112-1, the nodes 111-1 and 111-3 are connected by communication link 112-2, the nodes 111-2 and 111-3 are connected by communication link 112-3, the nodes 111-2 and 111-4 are connected by communication link 112-4, and the nodes 111-3 and 111-4 are connected by communication link 112-5. The nodes 111 may include routers, switches, or the like, as well as various combinations thereof. The nodes 111 may communicate based on communication protocol stacks based on the OSI model. The nodes 111-1 to 111-4 include congestion control elements 150-N1 to 150-N4 (collectively, congestion control elements 150-N), respectively, which may be configured to support various example embodiments of congestion control as presented herein (e.g., supporting protocol agnostic cognitive congestion control which supports various aspects of L3 congestion control as presented herein).

The communication network 110 may be configured to implement various aspects of Universal—Network Protocol Encapsulation (Universal-NPE). For example, the communication network 110 may be configured to provide one or more of the following aspects: (1) a messaging capability in relatively large-scale flat network architectures where link layer protocols may scale to support edge-to-edge, ultra-low latency communications, (2) vertical context transparency of protocols for autonomous network control and/or dynamic improvement or optimization, (3) explicit identification of virtual networks and/or network slices at the messaging level, (4) increased throughput efficiency via message tagging to summarize control plane information, and/or (5) a capability to represent any data in packet transmission required by any protocol or control plane function. For example, the communication network 110 may be configured to use Unified-NPE, which would provide one or more of the following aspects for packet transmission: (1) grouping message data units in at least three categories (e.g., "connection," "network function," and "application"), each with different encapsulation rules, (2) using a "network identifier" as the top-level primary key to characterize the context of the whole message, (3) using a message tagging technique to reduce the impact of the control field overhead on network utilization, and/or (4) a uniform message encapsulation structure with less (e.g., a minimal set of) rules available to all protocols above the physical layer. It will be appreciated that the communication network 110 may be configured to support various other aspects of Universal-NPE.

It will be appreciated that the communication network 110, although primarily presented with respect to a specific topology (i.e., specific numbers and arrangements of nodes 111 and communication links 112), may be implemented in various other topologies (e.g., using other numbers and/or other arrangements of nodes 111 and/or communication links 112).

The controller 120 may be configured to provide various control functions for the communication network 110, including for the nodes 111 and the communication links 112 which connect the nodes 110. For example, the controller 120 may be configured to support network management functions, network provisioning functions, service provisioning functions, network monitoring functions, network fault detection functions, network fault mitigation functions, or the like, as well as various combinations thereof. It will be appreciated that the set of control functions provided by the controller 120 for the communication network 110 may vary depending on various aspects of the communication network 110 (e.g. the type of packet switching technology used, the types of communication protocols used, or the like, as well as various combinations thereof).

It will be appreciated that the communication system 100 may be implemented in various other ways.

Various example embodiments for protocol agnostic cognitive congestion control are configured to support L3 congestion control in IP networks. Various example embodiments for supporting L3 congestion control for a flow in an IP network may be based on configuration of an L3 element of the sending node (e.g., an L3 protocol handler or other suitable L3 element that is providing L3 functions for the flow) to associate a context key provided by an L4+ element of the sending node (e.g., originated by the application originating the flow, generated by an L4 protocol handler supporting the flow, or the like) with packets of the flow at L3, request and receive target transmission rates computed by transit nodes on the path of the flow for the context key, and control transmission of packets of the flow, based on the target transmission rates reported by the transit nodes on the path of the flow for the context key, in a manner for controlling or preventing congestion on the path of the flow.

Various example embodiments for supporting L3 congestion control in IP networks may be further understood by first considering various aspects of L4+ congestion control (e.g., congestion control at L4 or above in the OSI model) typically applied in IP networks. At L3 of IP networks, link congestion at an L3 node (e.g., a router or a packet switch) generally occurs when the corresponding egress interface of the L3 node receives more packets than it can immediately forward. At L4 of IP networks, connection-oriented L4 protocols, such as TCP, SCTP, and QUIC, typically support congestion control algorithms which react to the L3 congestion. Connection-oriented L4 protocols typically respond to congestion indications (e.g., obtained by the observation of packet losses, round-trip-time (RTT) measurements, and explicit congestion notification (ECN) markings in data packets) by throttling the transmission rate of the data sources. For example, with many L4 congestion control mechanisms, right after the transmission starts, the L4 congestion algorithm at the data source increases the packet transmission rate until a packet loss or other congestion indication is encountered. The source then backs off sharply, but soon after starts increasing the data rate again until a new packet loss or congestion indication is encountered. The pattern repeats with the instantaneous throughput oscillating to form a saw-tooth pattern around the average throughput of the connection, resulting in high throughput variance around the average throughput of the connection. The congestion control (CC) algorithms adopted by these L4 protocols have been improving, but often still suffer from limitations such as: (1) relying on symptoms of the presence of congestion (e.g., packet loss events, increasing RTT measurements, explicit congestion notifications, or the like) such that congestion avoidance is only activated after congestion is already being encountered, (2) having the sender increase the transmission rate without knowing how the congestion state of the links in the network paths of the connection is evolving, and (3) having the congestion control applied at a different layer (L4) than where the congestion conditions are actually being experienced (at L3 by packets of the connectionless IP protocol). These and various other limitations may be overcome by various example embodiments of protocol agnostic cognitive congestion control which support L3 congestion control, which are discussed further below.

Figure 2:
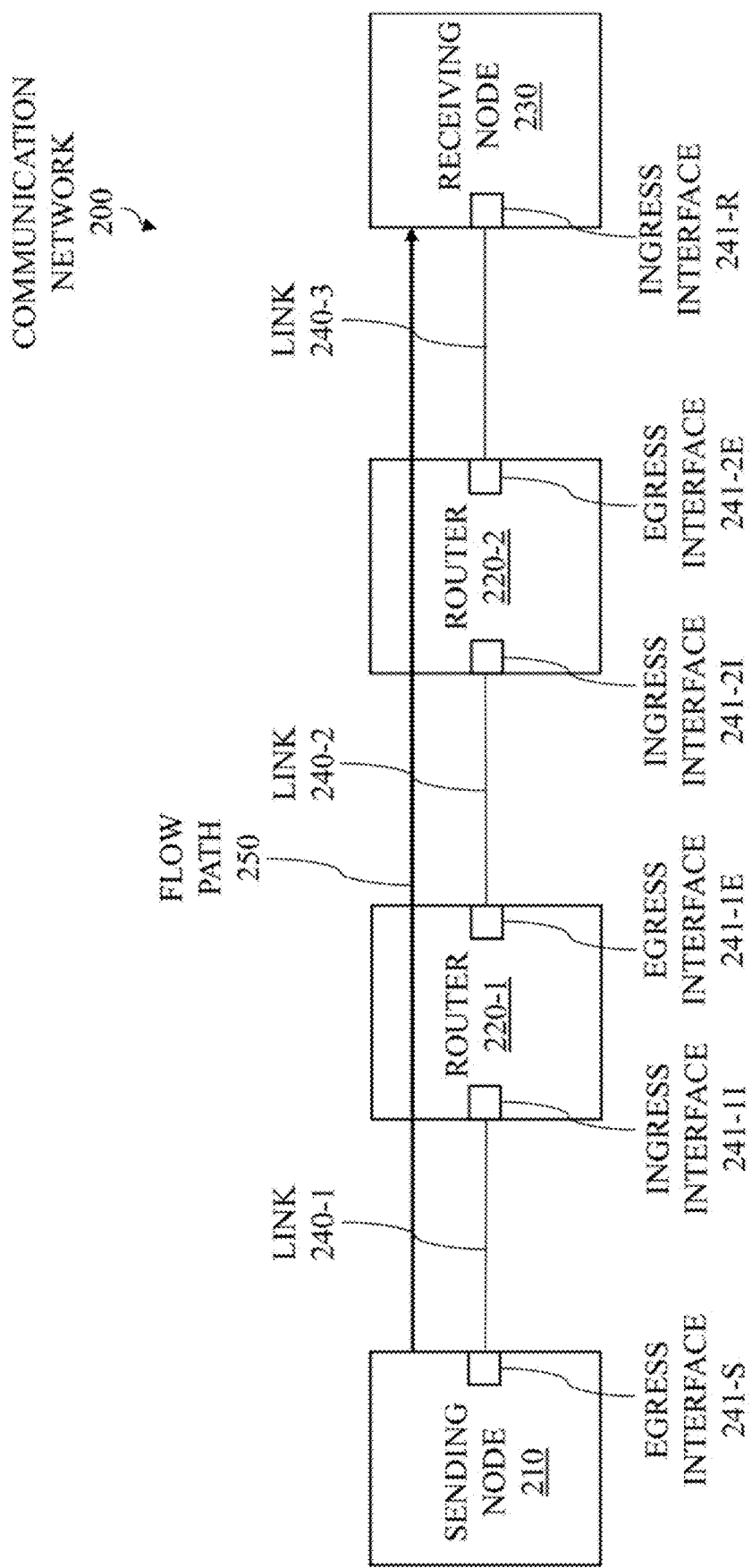
FIG. 2 depicts an example embodiment of a communication network configured to support protocol agnostic cognitive congestion control.

FIG. 2 depicts an example embodiment of a communication network configured to support protocol agnostic cognitive congestion control.

The communication network 200 includes a sending node (SN) 210, a pair of routers (RTs) 220-1 and 220-2 (collectively, RTs 220), and a receiving node (RN) 230. The SN 210 is communicatively connected to the RT 220-1 via a link 240-1 that connects an egress interface 241-S on the SN 210 to an ingress interface 241-1I on the RT 220-1. The RT 220-1 is communicatively connected to the RT 220-2 via a link 240-2 that connects an egress interface 241-1E on the RT 220-1 to an ingress interface 241-2I on the RT 220-2. The RT 220-2 is communicatively connected to the RN 230 via a link 240-3 that connects an egress interface 241-2E on the RT 220-2 to an ingress interface 241-R on the RN 230. There is a flow path 250 from the SN 210 to the RN 230 that traverses the RTs 220 and the links 240).

The communication network 200 supports communication of data from the SN 210 to the RN 230. The SN 210 transmits data to the RN 230 via the RTs 220. The SN 210 transmits a data block to the RN 230. The data of the data block are subdivided and sent as packets. The set of packets that carries a data block is referred to as a flow. Flows of packets have several associative relationships. Packets that are sent with the same receiving address indication (including the logical port number) are associated with a unique flow key. A set of flows may belong to the same application session of an application. Each application session of an application is uniquely identified by a context key (CK). The set of flows that are associated with the same CK is referred to as a set of context flows. The set of links that the packets traverse from SN to RN is referred to as a path. Context flows may belong to the same traffic class or to different traffic classes. A traffic class is an identifier used for prioritized handling of contending packet transmissions. Context flows that are represented by the same value of CK are assumed to have the same traffic class assignment.

The communication network 200 is configured to support L3 congestion control by providing protocol agnostic cognitive congestion control. The RTs 220, operating as L3 network nodes, maintain per-interface predictive statistics and determine target transmission rates for flows to operate at desired performance levels (e.g., with low latency and low throughput variance). The target transmission rates of the RTs 220 for the links on the path of a flow may be the rates (e.g., average rates, maximum rates, or the like) that, as far as the respective RTs 220 are concerned, the SN 110 should be using for transmitting on the links of the RTs 220 for the path. The SN 210 requests the target transmission rates from the RTs 220 for new flows started by the SN 210 and for existing flows supported by the SN 210. The SN 210 may receive the target transmission rates of the RTs 220 from the RTs 220 directly or may receive the target transmission rates of the RTs 220 from the RN 230 where the RTs 220 report the target transmission rates to the RN 230 and the RN 230 sends the target transmission rates to the SN 210. The SN 210 associates each L3 packet flow with a context key obtained from any L4+ entity on the SN 210 (e.g., an application session identifier assigned by the application on the SN 210 which originates the flow, an identifier generated by an L4 protocol handler on the SN 210, or the like). The SN 210 executes a congestion control algorithm at L3, the layer where the congestion is actually experienced, based on matching of the context key associated with the flows and the target transmission rates reported by the RTs 220 for that context key. In this manner, the communication network 200 is able to provide congestion control at L3, rather than relying on L4 congestion control mechanisms which often result in increased latency and high throughput variance. The operation of the communication network 200 in support L3 congestion control may be further understood by way of reference to the example of FIG. 3.

Figure 3:
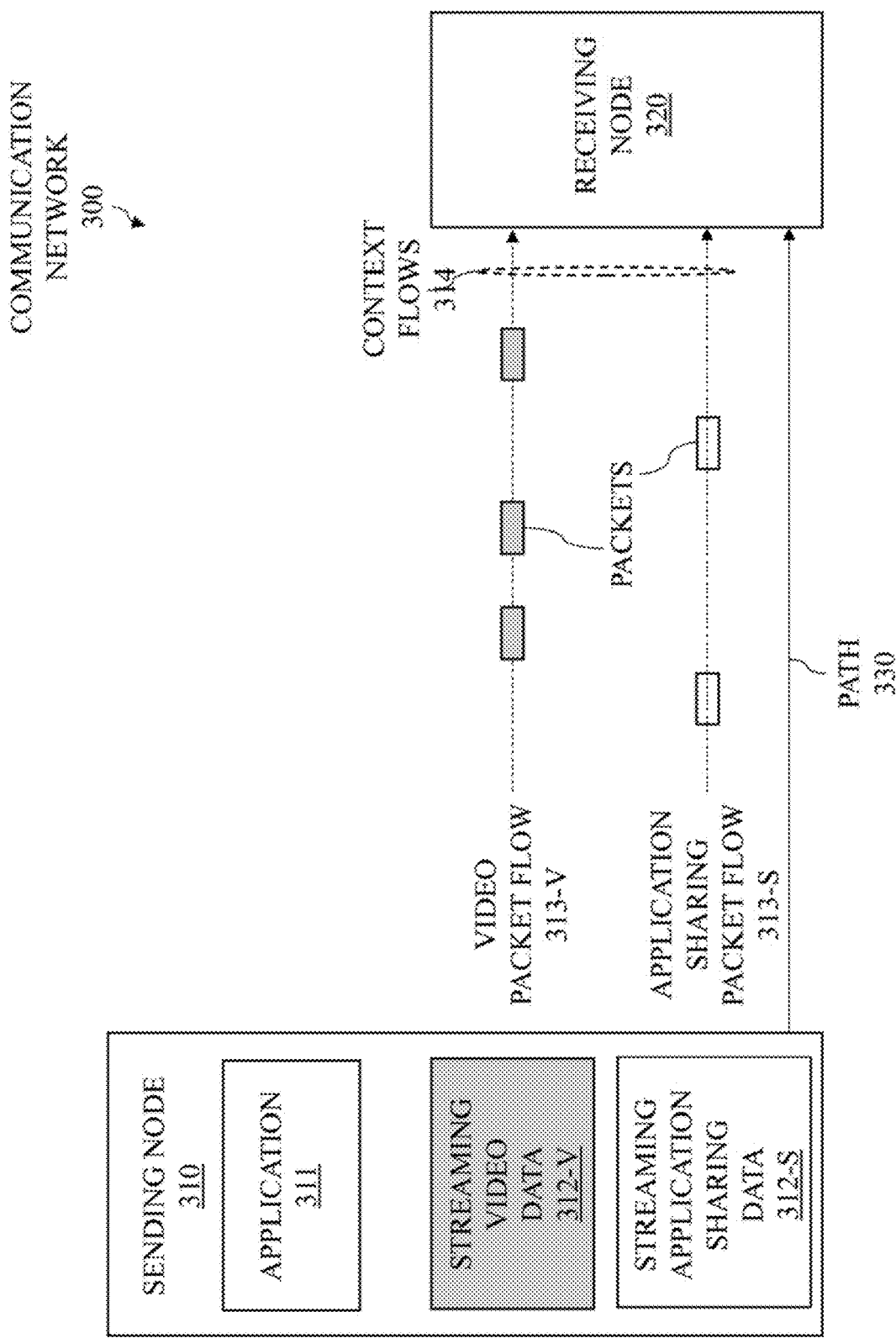
FIG. 3 depicts an example embodiment of a communication network for illustrating video conferencing between a sending node and a receiving node.

FIG. 3 depicts an example embodiment of a communication network for illustrating video conferencing between a sending node and a receiving node. As depicted in FIG. 3, a communication network 300 includes a sending node 310 and a receiving node 320, which are communicatively connected via a path 330. The sending node 310 is running an application 311 that produces two types of data including streaming video data 312-V and streaming application sharing data 312-S. The sending node 310 packetizes the streaming video data 312-V to form a video packet flow 313-V which is sent toward the receiving node 320 via the path 330. The sending node 310 packetizes the streaming application sharing data 312-S to form an application sharing packet flow 313-S which is sent toward the receiving node 320 via the path 330. The video packet flow 313-V and the application sharing packet flow 313-S form a pair of context flows 314 which are associated with a common context key. It will be appreciated that use of L3 congestion control to support transmission of a set of context flows over a path (e.g., context flows 314 over path 330) may be further understood by way of reference to FIG. 4.

Figure 4:
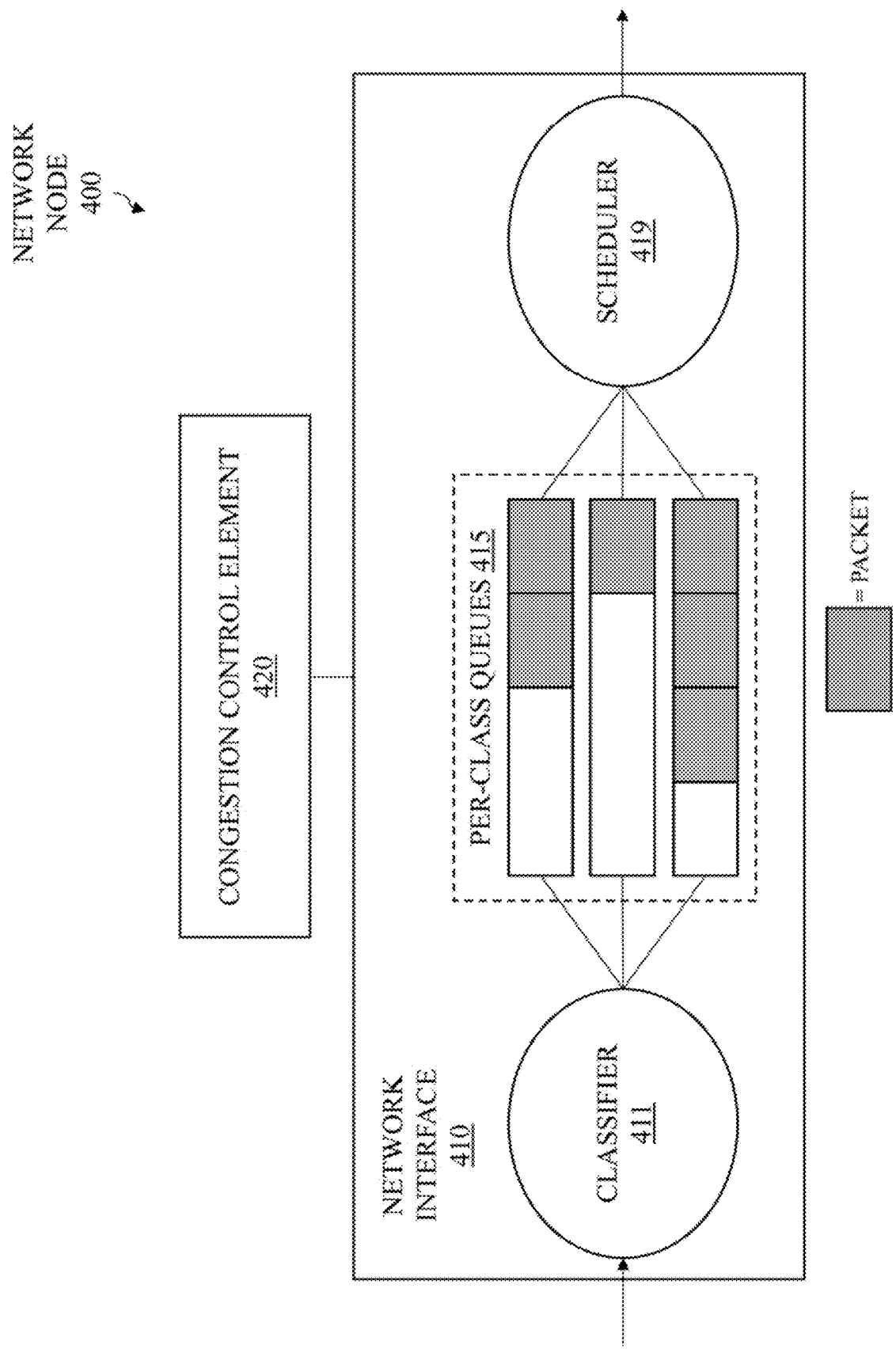
FIG. 4 depicts an example embodiment of a network node configured to support protocol agnostic cognitive congestion control in a communication network.

FIG. 4 depicts an example embodiment of a network node configured to support protocol agnostic cognitive congestion control in a communication network.

The network node 400 includes a network interface 410 configured to support communication of packets via the network node 400 and a congestion control element 420 configured to support congestion control in a network in which the network node 400 is disposed.

The network interface 410 is an egress interface of the network node 400. The network interface 410 includes a classifier 411, a set of per-class queues 415, and a scheduler 419. It will be appreciated that the network node 400, although a single egress interface is depicted, may include various ingress interfaces for receiving packets, various other egress interfaces for sending packets, or the like, as well as various combinations thereof.

The network interface 410 may experience contention when flows received over different ingress network interfaces (omitted for purposes of clarity) are transmitted over the same egress interface (namely, the network interface 410). The network interface 410, as a way to control the effects of such contention, may be configured such that the classifier 411 buffers packets of flows of different traffic classes into respective ones of the per-class queues 415 and the scheduler 419 serves the per-class queues 415 in strict-priority order to differentiate the service performance of traffic classes with different priorities, based on pre-configured policies.

The network interface 410 may experience congestion. The packets leave via the network interface 410 at the speed of the link that is connected to the network interface 410 (which has been omitted for purposes of clarity). If the collective arrival rate of the packets (of the same class type) destined out of the network interface 410 is higher than the configured speed of the outgoing queue, then the packets that cannot immediately be transmitted on the network interface 410 are buffered in the per-class queues 415 for the traffic classes. The scheduler 419 determines how the packets in per-class queues 415 are served for transmission on the link.

The congestion control element 420 is configured to support congestion control in a network in which the network node 400 is disposed. The congestion control element 420 is configured to support congestion control based on computation of target transmission rates for sets of context flows traversing the network node 400 (e.g., computation of target transmission rates for sets of context flows traversing the network interface 410 based on monitoring of the network interface 410). The congestion control element 420 is configured to support measurement of traffic statistics of the network interface 410. The congestion control element 420 is configured to support computation of target transmission rates for sets of context flows traversing the network interface 410 on paths from sending nodes to receiving nodes (e.g., target transmission rates for sets of context flows associated with respective context keys for which target transmission rates are requested by associated sending nodes) based on the measurement of the traffic statistics of the network interface 410. The congestion control element 420 is configured to control sending of the target transmission rates for delivery of the target transmission rates to the sending nodes requesting the target transmission rates (e.g., sending directly toward the sending nodes, sending toward receiving nodes of the paths for echoing of the target transmission rates back to the sending nodes of the paths, or the like, as well as various combinations thereof).

It will be appreciated that the sending node 400 may include various other elements, interfaces, or the like, as well as various combinations thereof.

Figure 5:
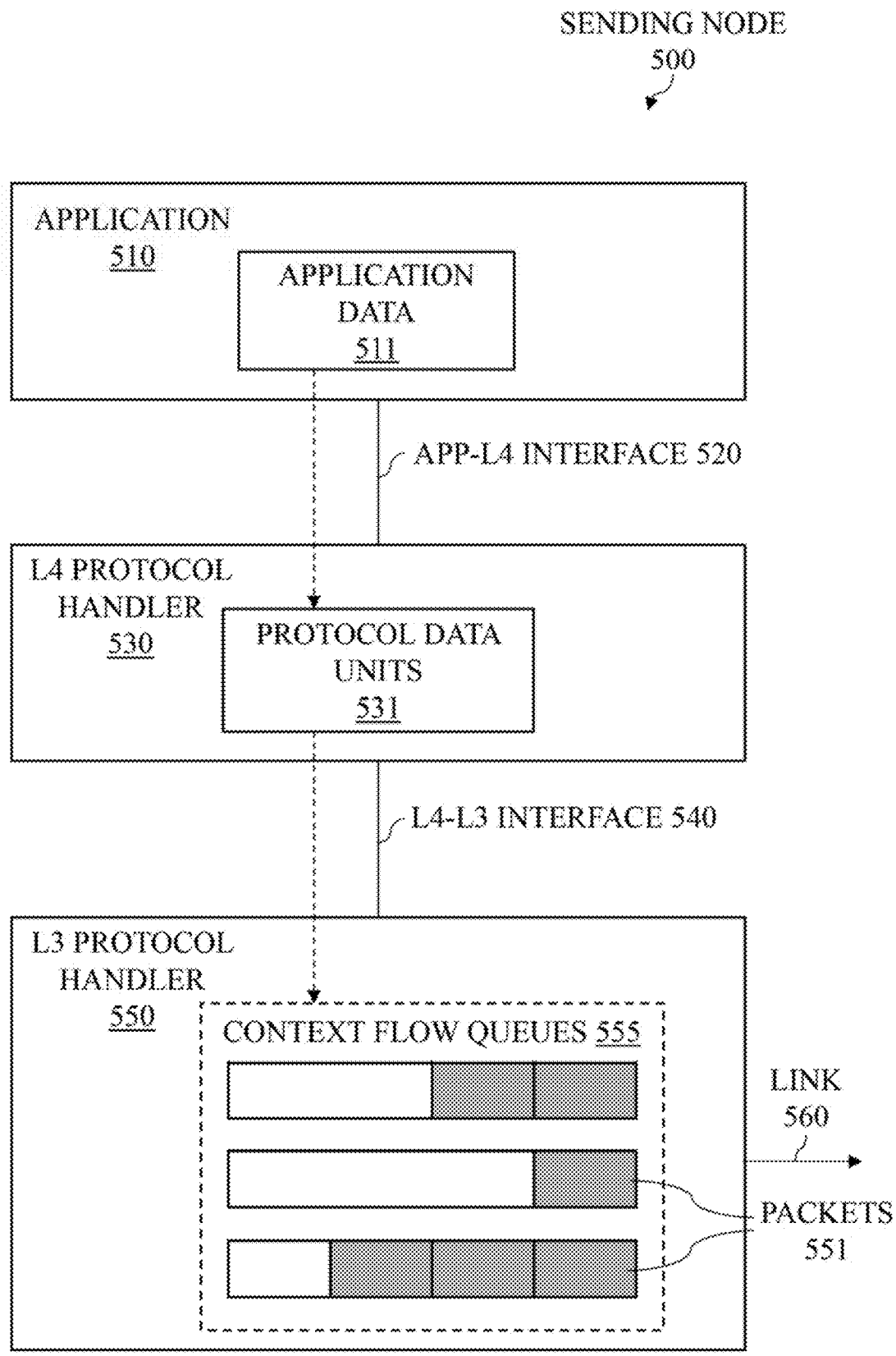
FIG. 5 depicts an example embodiment of a sending node configured to support protocol agnostic cognitive congestion control in a communication network.

FIG. 5 depicts an example embodiment of a sending node configured to support protocol agnostic cognitive congestion control in a communication network.

As depicted in FIG. 5, the sending node 500 includes an application 510, an L4 protocol handler 530, an L3 protocol handler 550, and a link 560. The application 510 and L4 protocol handler 530 are communicatively connected via an APP-L4 interface 520. The L4 protocol handler 530 and the L3 protocol handler 550 are communicatively connected via an L4-L3 interface 540. The L3 protocol handler 550 is communicatively connected to the link 560 for sending packets over the link 560.

As depicted in FIG. 5, the sending node 500 supports transmission of application data of the application 510 to a receiving node via the link 560. As discussed further below, the sending node 500 supports transmission of the application data of the application 510 to the receiving node based on application of congestion control at L3 by the L3 protocol handler 550.

The application 510 generates application data 511 which is intended for delivery to a receiving node. The application 510 passes the application data 511 to the L4 protocol handler 530 via the APP-L4 interface 520. For example, in practice this may be a Python program passing data to a Linux data socket, although it will be appreciated this may be implemented in various other ways.

The L4 protocol handler 530 receives the application data 511, organizes the application data 511 into a set of protocol data units (PDUs) 531, and passes the PDUs 531 to the L3 protocol handler 550 via the L4-L3 interface 540. For example, in practice this may be a TCP protocol handler passing data blocks to the IP protocol handler for transmission, although it will be appreciated this may be implemented in various other ways.

The L3 protocol handler 550 receives the PDUs 531 and arranges the PDUs 531 into packets 551 for transmission on the link 560. The L3 protocol handler 550 includes a set of context flow queues 555 configured to store the packets 551 based on CKs associated with the packets 551.

The L3 protocol handler 550 controls transmission of the packets 551 from the context flow queues 555 based on L3 congestion control (e.g., determining the minimum target transmission rate amongst the routers along the path to the receiving node and using the minimum target transmission rate for transmission of the packets 551 from the context flow queues 555 in a manner that avoids congestion along the path to the receiving node).

It will be appreciated that the sending node 500 may include various other elements, interfaces, or the like, as well as various combinations thereof.

In at least some example embodiments, L3 congestion control may be supported as follows. The RTs continuously monitor traffic statistics at their egress interfaces. The application, together with its data transmission request, provides a CK to the L4 protocol handler of the SN. The CK may be in the form of a context key value, a context key label uniquely identifying a context key value, or the like. The L4 protocol handler, together with the set of PDUs, passes the CK to the L3 protocol handler of SN. The L3 protocol handler of the SN arranges the PDUs into packets and places the packets into queues based on the CK. The SN requests each RT on the path of the flow from the SN to the RN to report the target transmission rate for a new set of flows to be forwarded without being queued (e.g., a target average transmission rate or other suitable type of target transmission rate). The L3 protocol handler of the RN echoes the target transmission rate reports of the RTs back to the SN. The SN selects the minimum of the target transmission rates reported by the RTs and starts sending packets to the RN at the selected minimum target transmission rate. The SN may again request target transmission rates from the RTs (e.g., periodically, in response to one or more conditions, or the like, as well as various combinations thereof) so as to ensure that the SN continues using the optimal target transmission rate, which may vary over time, for transmitting packets over the path from the SN to the RN. An example embodiment of such a method is presented with respect to FIG. 6.

Figure 6:
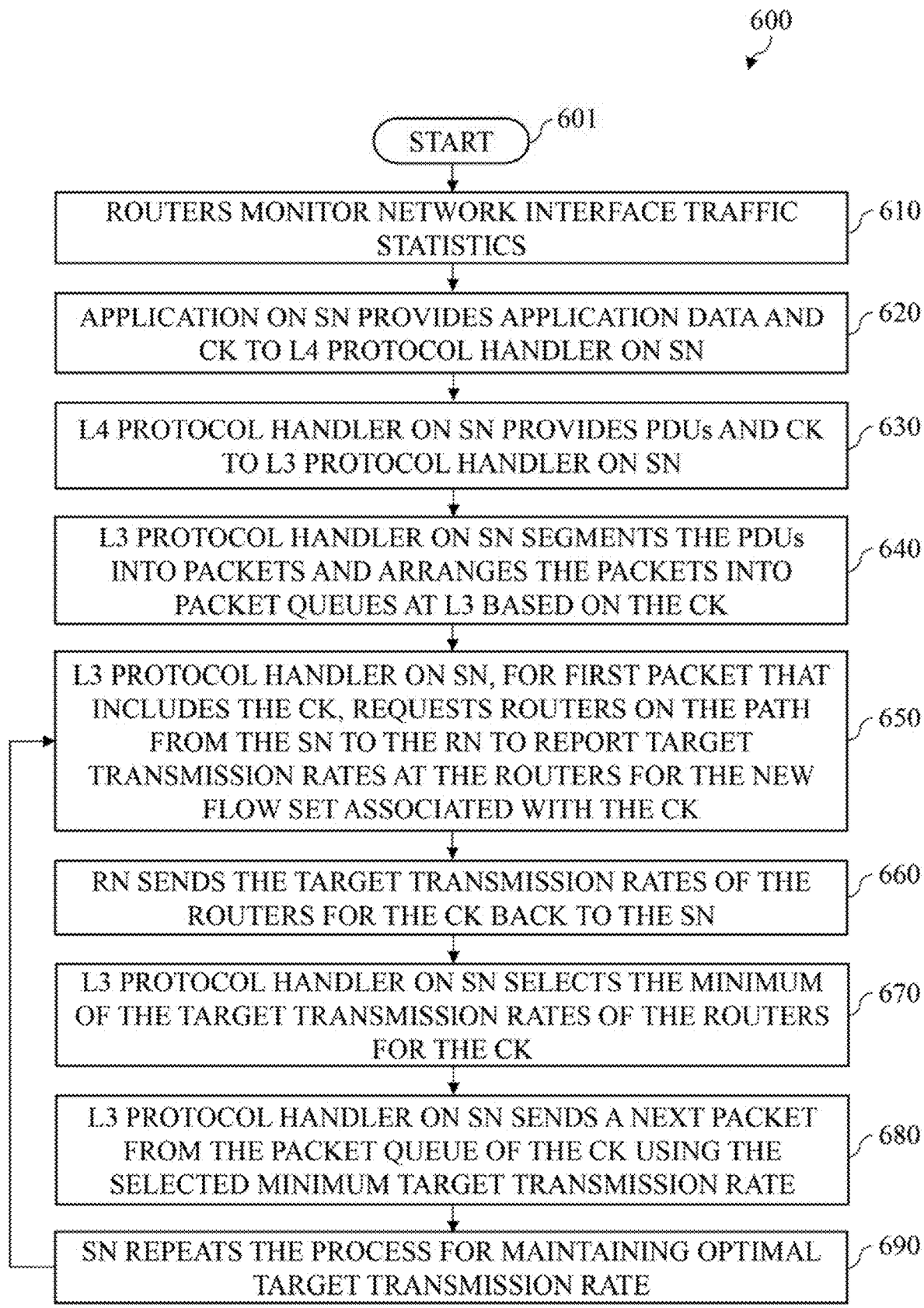
FIG. 6 depicts an example embodiment of a process for supporting protocol agnostic cognitive congestion control in a communication network.

FIG. 6 depicts an example embodiment of a process for supporting protocol agnostic cognitive congestion control in a communication network.

At block 601, the process 600 begins. It will be appreciated that the process 600, although not depicted as ending (since it may continue to be executed for updating the optimum target transmission rate over time), may end under various conditions (e.g., when the set of flows of the CK is terminated or in response to other conditions).

At block 610, routers (RTs) monitor network interface traffic statistics of interfaces at the RTs. It will be appreciated that RTs are in the best position to quantify the optimum throughput for the packet flows while satisfying a set of constraints—for example, to set the optimum throughput level that maintains the desired level of latency without building up queues. The set of constraints may include different metrics depending on the configured policies, such as latency, throughput, or the like, as well as various combinations thereof.

At a given RT, the per-class metrics of interest for network interfaces for the purpose of controlling congestion may include, among others, the following: (1) configured bandwidth capacity, (2) target utilization threshold, (3) traffic load predictions (e.g., number of flows, average per-flow throughput, or the like, as well as various combinations thereof), and (4) maximum target queue delay (which may also be represented as queue size together with transmission rate). It will be appreciated that fewer or more per-class metrics may be collected, evaluated, and utilized within the context of congestion control.

When the SN requests, from an RT, the target transmission rate for a set of flows identified collectively by a CK (e.g., a common CK value, a common CK label for a CK value, or the like), the RT runs a set of computations to determine the target transmission rate for the set of flows identified by the CK. The computations to determine the target transmission rate for a set of flows identified by a CK may be based on variables and constraints as discussed below.

The computations to determine the target transmission rate may be based on the following variables:

t—time interval
c—egress transmission capacity
u—utilization
U—target utilization
n—predicted number of active context flows
$r_p$—predicted average throughput
$r_n$—target transmission rate
$d_p$—expected buffering delay of a given percentile The computations to determine the target transmission rate may be based on the following constraint:

Constraint: When a set of new flows arrive from an SN to an RT, the total average utilization of the associated egress queues should satisfy the following constraints:

$$u \leq U$$
$$u = (n \times r_p + r_n)/c$$

The determination of the value of target utilization (U) may be performed as follows. Given that the total average throughput is less than the allocated portion of the link capacity, the likelihood of a packet being delayed instantaneously in the egress queue will depend on the burstiness of the incoming packet arrivals (within the scope of traffic class prioritization). This type of probabilistic value is represented by a random variable. However, the probability distribution function (PDF) of such a variable related to network traffic typically will not accurately fit any known model formulation. To ease the operational challenge, instead of targeting maximum delay bounds, working with percentile bounds ($d_p$) on the random variable can provide upper limits with low variance—for example, 98% of the packet delays will not be more than 10 ms. Artificial Intelligence (AI)/Machine Learning (ML) techniques also may be used to dynamically compute U for a given set of criteria for the interface (such as the time of day, calendar, recent traffic activities, and many others related to the given resource).

An RT, upon request from an SN and based on the above calculation or similar calculations, reports the target transmission rate ($r_n$) of context flows that are coming from SN. This is the prediction by the RT that, if the SN sends the flows at rate $r_n$ within the next time interval (t), the flows are not expected to encounter buffer delays in excess of $d_p$.

It will be appreciated that, although primarily presented with respect to example embodiments in which the RT determines the target transmission rate based on use of a specific set of computations based on a specific set of variables and constraints, in at least some example embodiments the RT may determine the target transmission rate based on other computations, based on computations based on other variables and/or constraints, or the like, as well as various combinations thereof.

It will be appreciated that, although primarily presented with respect to example embodiments in which the target transmission rate determined by the RT is an average transmission rate, in at least some example embodiments the target transmission rate determined by the RT may be a transmission rate other than an average transmission rate.

At block 620, an application on the SN provides application data along with a CK to the L4 protocol handler on the SN. The CK associates the provided application data with a set of flows that use the same traffic service class. The application may pass the application data and the CK to the L4 protocol handler via the App-L4 interface (as illustrated in FIG. 5). It will be appreciated that, although primarily presented with respect to example embodiments in which the application provides the CK for the data, in at least some example embodiments the L4 protocol handler may generate the CK for the data blocks rather than the application providing the CK to the L4 protocol handler (although it is noted that the automatic generation of the CK by the L4 protocol handler, in at least some cases, may have a semantically less accurate scope than if the CK is passed down by the application to the L4 protocol handler). The CK is the key for the L3 congestion control algorithm that determines the context to associate the RT measurements with the SN decisions.

At block 630, the L4 protocol handler on the SN provides PDUs and the CK to the L3 protocol handler on the SN. The PDUs are created by the L4 protocol handler based on the data received by the L4 protocol handler from the application. The CK, as indicated above, associates the provided application data with a set of flows that use the same traffic service class. The L4 protocol handler may pass the PDUs and the CK to the L3 protocol handler via the L4-L3 interface (as illustrated in FIG. 5).

At block 640, the L3 protocol handler on the SN segments the PDUs into packets and arranges the packets into packet queues at L3 based on the CK. The CK is included in each of the packets. The CK allow the L3 protocol handler to associated different phases of related packet transmissions and responses.

At block 650, the L3 protocol hander of the SN, for the first packet that includes the CK, requests the RTs on the path from the SN to the RN to report the target transmission rates ($r_n$) at the RTs for the new flow set associated with the CK.

The L3 protocol handler of the SN may request that each of the RTs on the path from the SN to the RN report the target transmission rate ($r_n$) by including within the first packet sent on the path from the SN to the RN: (1) a report request indication indicative that the SN is requesting reporting of the target transmission rates ($r_n$) by the RTs and (2) the CK for which the target transmission rates ($r_n$) are being requested.

The RTs on the path from the SN to the RN receive the first packet and, based on the report request indication and the CK included in the packet, insert their target transmission rates ($r_n$) into the packet before forwarding the packet to the next hop on the path from the SN to the RN. In at least some example embodiments, if the target transmission rate ($r_n$) value to be reported by an RT is larger than any of the target transmission rate ($r_n$) values already reported (i.e., already included within the first packet when the first packet is received by that RT), then the RT may choose not to report its target transmission rate ($r_n$) value as this will reduce overhead.

In this manner, the target transmission rates ($r_n$) of each of the RTs on the path from the SN to the RN (or a subset of the target transmission rates ($r_n$) of the RTs that includes at least the minimum target transmission rate ($r_n$) value where at least some of the downstream RTs on the path decide not to report larger target transmission rate ($r_n$) values) are delivered to the RN so that the RN can then provide the target transmission rates ($r_n$) back to the SN.

At block 660, the RN sends the target transmission rates ($r_n$) of the RTs back to the SN. The L3 protocol handler of the RN may store the target transmission rates ($r_n$) of the RTs associated with the CK. The RN may then include the target transmission rates ($r_n$) of the RTs associated with the CK in the first packet being sent from the RN back to the SN, such that the SN obtains the target transmission rates ($r_n$) reported by the RTs on the path from the SN to the RN.

At block 670, the L3 protocol handler of the SN selects the minimum of the target transmission rates (i.e., the smallest target transmission rate ($r_n$) value, which is denoted as minimum target transmission rate ($r_{n-min}$)) from the set of target transmission rates ($r_n$) of the RTs.

At block 680, the L3 protocol handler of the SN, starting with the next packet after determining the minimum target transmission rate ($r_n$) for the CK, sends out the packets in the packet queue associated with the CK using the selected minimum target transmission rate ($r_{n-min}$).

At block 690, at least a portion of the process is repeated. The SN, after sending the packets of the CK at the minimum target transmission rate ($r_{n-min}$) for a set time interval, again requests the RTs to report updated target transmission rates ($r_n$) for the CK. It will be appreciated that the SN may request reporting of updated target transmission rate ($r_n$) values periodically (e.g., with each packet sent out, with every other packet sent out, with every fifth packet sent out, or the like), randomly (e.g., based on a determination that the traffic statistics show very low variance for the packet arrival rates and/or based on other conditions), or the like, as well as various combinations thereof. In this manner, the system ensures that the optimal target rate continues to be used, thereby reducing or even eliminating congestion.

In at least some example embodiments, the RN, rather than sending each of the target transmission rates ($r_n$) reported by the RTs on the path back to the SN, may select the minimum target transmission rate ($r_{n-min}$) from the set of target transmission rates ($r_n$) received from the RTs and provide the selected minimum target transmission rate ($r_{n-min}$) to the SN for use by the SN in sending subsequent packets of the flows associated with the CK. It will be appreciated that this will reduce overhead while still enabling the SN to determine the minimum target transmission rate ($r_{n-min}$) to be used for transmitting subsequent packets over the path from the SN to the RN.

In at least some example embodiments, the SN, in addition to requesting that the RT provide the target transmission rate, also may request the RT to report statistical measures of the traffic at the interface of the path for a given time interval. These additional measures may include one or more of ingress bytes, egress bytes, packets, flows, traffic classes, variance, or the like, as well as various combinations thereof. These additional measures may be used within the context of the L3 congestion control algorithm, may be used for higher-level network routing decisions based on cognitive exploration techniques, or the like, as well as various combinations thereof.

In at least some example embodiments in which the RT reports provided to the SN include additional statistical measures in addition to the target transmission rates, the SN may utilize some or all of these additional reported statistical measures within the context of the L3 congestion control algorithm executed for the path.

In at least some example embodiments in which the RT reports provided to the SN include additional statistical measures in addition to the target transmission rates, the SN may utilize some or all of these additional reported statistical measures to acquire a higher-level understanding of the network state from a holistic point of view that includes the topology surrounding the path. The SN may host cognitive functions to learn these characteristics and make higher-level path routing decisions, may interact with other functional entities that may implement these types of cognitive functions to make decisions, or the like, as well as various combinations thereof. For example, the SN may realize that a particular RT is introducing excessive delay variance on the path, and it may work with a routing function to explore alternative paths to improve and maintain the desired end-to-end delay performance.

It will be appreciated that such additional statistical measures, as with reporting of the target transmission rates, may be reported using various types of messages (e.g., for IPV6 using one or more IPv6 Extension Headers (EHs), for Universal-NPE using one or more Universal-NPE type encapsulations, or the like, as well as various combinations thereof).

It will be appreciated that the SN may utilize some or all of these additional reported statistical measures in various other ways for improving end-to-end delivery of traffic within the network.

In at least some example embodiments, the SN and RTs, rather than requesting and reporting the target transmission rates in-band using the first packets sent on the path from the SN to the RN (for the target transmission rate requests) and from the RN back to the SN (for the target transmission rate reports), may request and/or report the target transmission rates in other ways.

For example, the SN, rather than requesting the target transmission rates in-band within the first packet sent on the path from the SN to the RN, may send one or more target transmission rate request messages to the RTs on the path from the SN to the RN (e.g., propagating a single out-of-band control message along the path such that it is received by each of the RTs on the path, propagating separate out-of-band control messages to each of the RTs on the path, or the like, as well as various combinations thereof). In at least some such example embodiments, the RTs may respond to the one or more target transmission rate request messages from the SN directly (e.g., by sending one or more corresponding target transmission rate response messages to the SN) or indirectly (e.g., by adding the target transmission rates to the first packet sent on the path from the SN to the RN for echoing back by the RN, by adding the target transmission rates to the first packet sent on the return path from the RN to the SN, or the like).

For example, the RTs, rather than responding to the target transmission rate request of the SN in-band may send one or more target transmission rate response messages out-of-band for supporting delivery of the target transmission rates to the SN. This may be supported irrespective of whether the target transmission rate request of the SN is sent in-band or out-of-band. In at least some such example embodiments, each RT may send a target transmission rate response message directly to the SN, RTs may aggregate target transmission rate responses into a single target transmission rate response message that is propagated to the SN along a reverse path from the RN to the SN, or the like, as well as various combinations thereof.

It will be appreciated that the target transmission rate information may be obtained by the SN from the RTs in various other ways.

In at least some example embodiments, the L3 congestion control algorithm may be used in combination with and/or in place of various legacy congestion control algorithms. It is noted that where the L3 congestion control algorithm is used in combination with legacy congestion control algorithms, the legacy congestion control algorithms may or may not be modified. For example, some of the existing algorithms may continue to be executed but some procedures of these existing algorithms may not be triggered (e.g., there will not be any packet drop or congestion indications encountered because of buffer growth). For example, the procedures related to RTT may still be active with no negative impact on the L3 congestion control algorithm. For example, RTT-based procedures may be replaced with blocking application programming interface (API) calls for data transfer on the L4-L3 interface (meaning that L4 would rely on L3's pacing for deciding when more data should be sent into the network). It will be appreciated that various other implementations may be supported.

Figure 7:
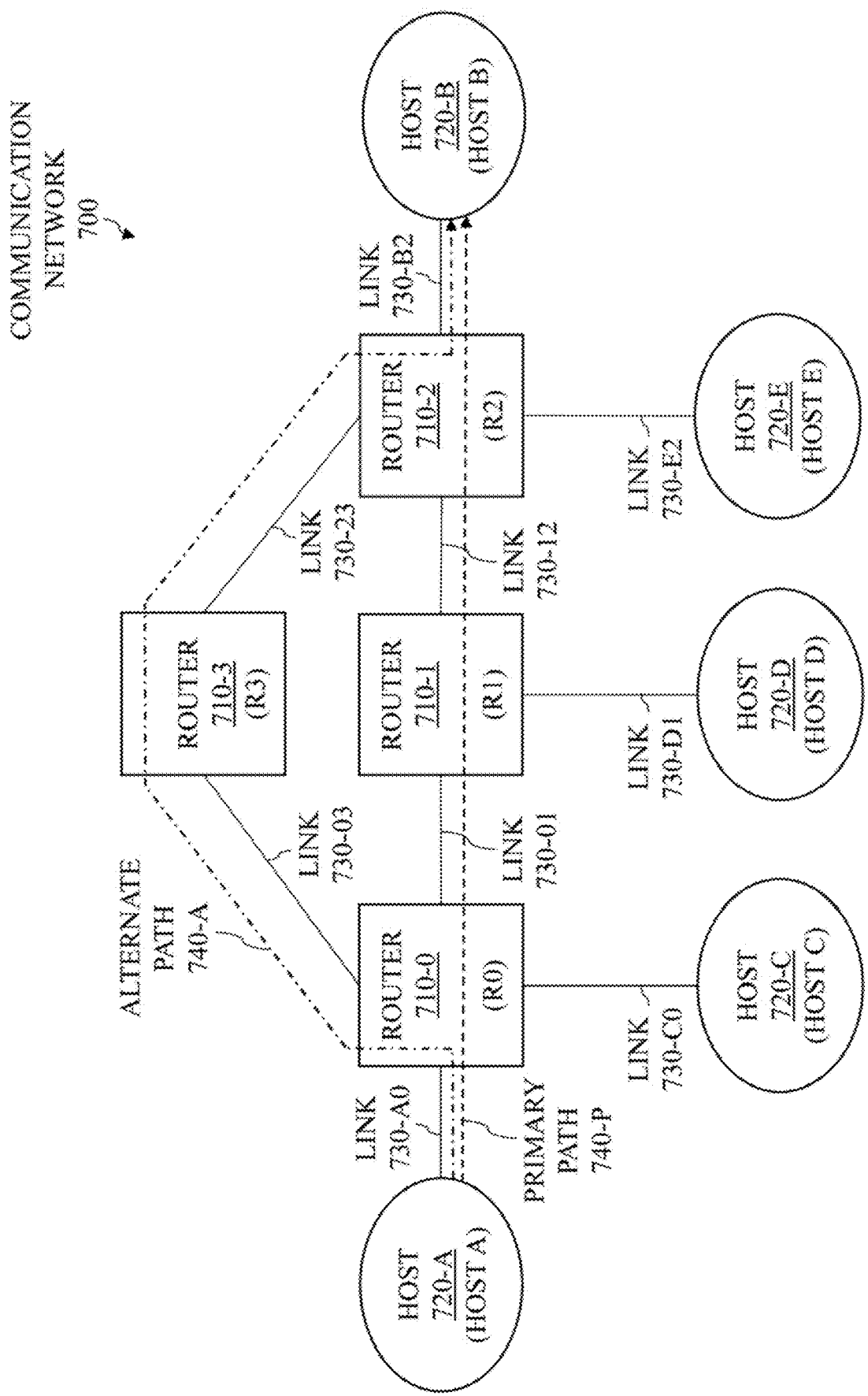
FIG. 7 depicts an example embodiment of a communication network for illustrating example embodiments of protocol agnostic cognitive congestion control.

FIG. 7 depicts an example embodiment of a communication network for illustrating example embodiments of protocol agnostic cognitive congestion control.

As depicted in FIG. 7, the communication network 700 includes four routers 710-0) through 710-3 (collectively, routers 710 which also are labeled as routers R0 through R3, respectively) supporting communications of five hosts 720-A through 720-E (collectively, hosts 720) which also are labeled as hosts A through E, respectively). The routers 710 and hosts 720) communicate via a set of links 730 (illustratively, link 730-01 between router R0 and router R1, link 730-12 between router R1 and router R2, link 730-03 between router R0 and router R3, link 730-23 between router R2 and router R3, link 730-A0 between host A and router R0, link 730-B2 between host B and router R2, link 730-C0 between host C and router R0, link 730-D1 between host D and router R1, and link 730-E2 between host E and router R2). The communication network 700 is configured to support Universal-NPE instead of IP packets as this allows complete flexibility in carrying any required information on the control plane and across protocol layers including the application layer, although it will be appreciated that any other suitable protocols may be used in other implementations.

In the example of FIG. 7, there is a primary path 740-P and an alternate path 740-A that can be selected by cognitive decision. The primary path 740-P is between host A and host B over links 730-A0, 730-01, 730-12, and 730-B2. The alternate path 720-A is between host A and host B over links 730-A0, 730-03, 730-23, and 730-B2. Hosts C and D generate background traffic to induce congestion (illustratively, host C sends traffic to host D and host D sends traffic to host E). CC-related measurements are done at the egress interfaces of routers R0, R1, and R3.

In the example of FIG. 7, based on a determination that traffic through router R1 is excessively bursty, the alternate path from host A to host B may be selected in place of the primary path from host A to host B for transmission of flows from host A to host B. It is noted that, even though the path through router R3 is not better than the path via router R1 (in terms of routing metrics), directing the flows via router R3 may achieve a lower average delay for the flows. In at least some example embodiments, these types of decisions may be made based on execution of the L3 congestion control algorithm. In at least some example embodiments, these types of decisions may be made by the help of cooperative operation of the L3 congestion control algorithm with the routing control agents, and other cognitive control agents in the network.

Figure 8:
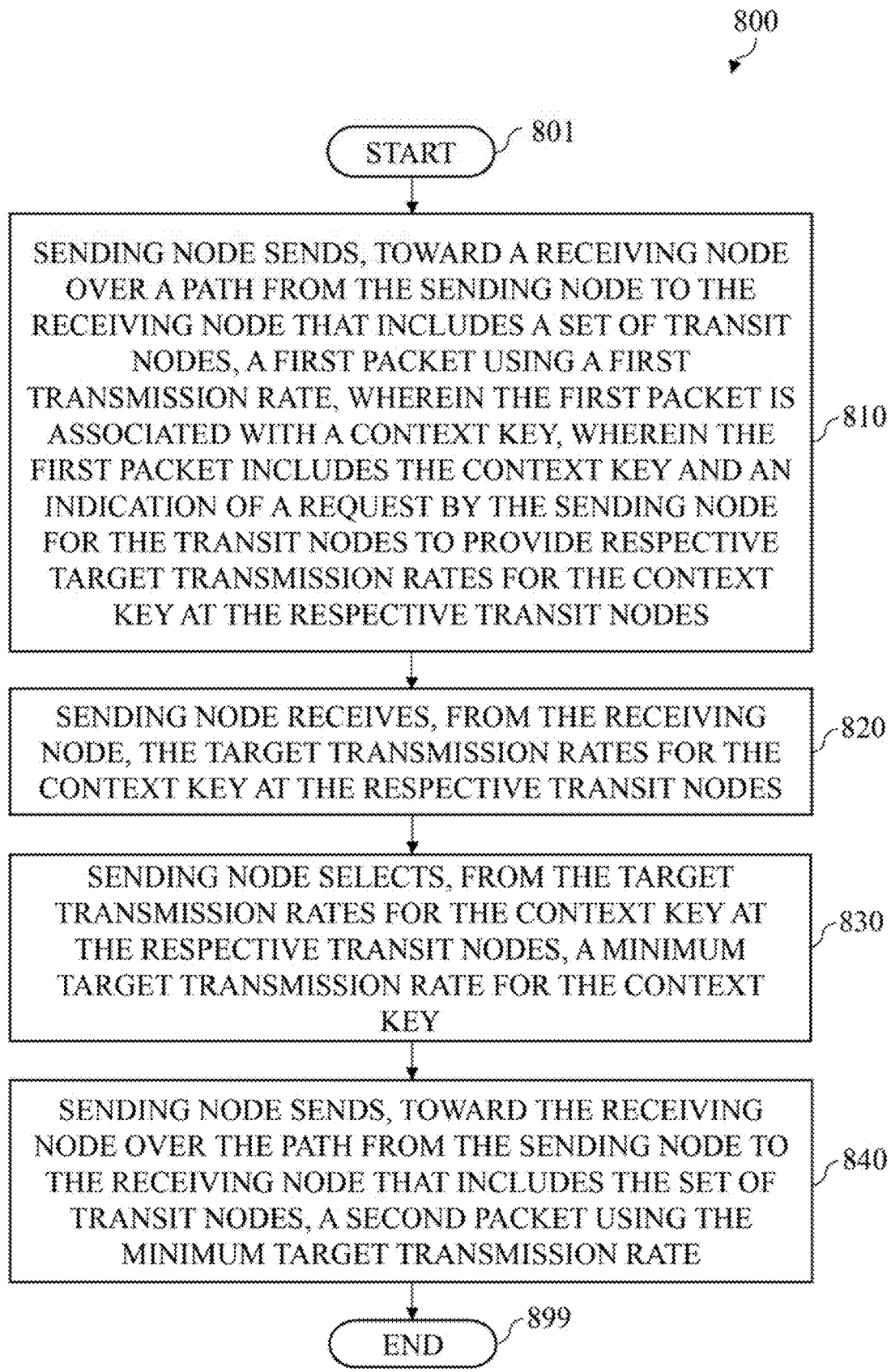
FIG. 8 depicts an example embodiment of a method for use by a sending node to support protocol agnostic cognitive congestion control in a communication network.

FIG. 8 depicts an example embodiment of a method for use by a sending node to support protocol agnostic cognitive congestion control in a communication network. It will be appreciated that, although primarily presented herein as being performed serially, at least a portion of the functions of method 800 may be performed contemporaneously or in a different order than as presented in FIG. 8. At block 801, the method 800 begins. At block 810, the sending node sends, toward a receiving node over a path from the sending node to the receiving node that includes a set of transit nodes, a first packet using a first transmission rate, wherein the first packet is associated with a context key, wherein the first packet includes the context key and an indication of a request by the sending node for the transit nodes to provide respective target transmission rates for the context key at the respective transit nodes. At block 820, the sending node receives, from the receiving node, the target transmission rates for the context key at the respective transit nodes. At block 830, the sending node selects, from the target transmission rates for the context key at the respective transit nodes, a minimum target transmission rate for the context key. At block 840, the sending node sends, toward the receiving node over the path from the sending node to the receiving node that includes the set of transit nodes, a second packet using the minimum target transmission rate. At block 899, the method 800 ends, although it will be appreciated that sending nodes may be configured to perform various other functions for supporting congestion control in the communication network.

Figure 9:
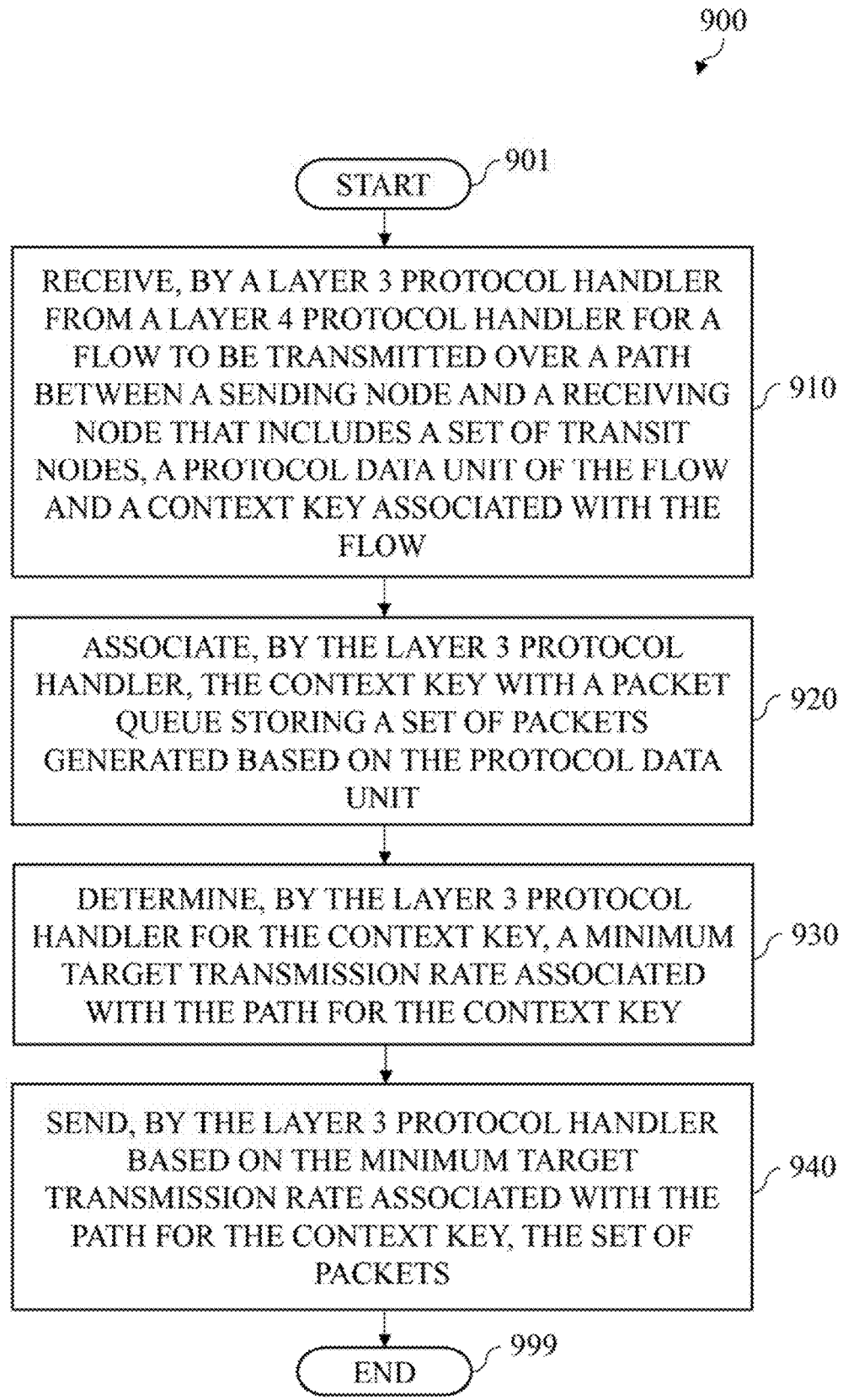
FIG. 9 depicts an example embodiment of a method for use by a sending node to support protocol agnostic cognitive congestion control in a communication network.

FIG. 9 depicts an example embodiment of a method for use by a sending node to support protocol agnostic cognitive congestion control in a communication network. It will be appreciated that, although primarily presented herein as being performed serially, at least a portion of the functions of method 900 may be performed contemporaneously or in a different order than as presented in FIG. 9. At block 901, the method 900 begins. At block 910, receive, by a layer 3 protocol handler from a layer 4 protocol handler for a flow to be transmitted over a path between a sending node and a receiving node that includes a set of transit nodes, a protocol data unit of the flow and a context key associated with the flow. At block 920, associate, by the layer 3 protocol handler, the context key with a packet queue storing a set of packets generated based on the protocol data unit. At block 930, determine, by the layer 3 protocol handler for the context key, a minimum target transmission rate associated with the path for the context key. At block 940, send, by the layer 3 protocol handler based on the minimum target transmission rate associated with the path for the context key, the set of packets. At block 999, the method 900 ends, although it will be appreciated that sending nodes may be configured to perform various other functions for supporting congestion control in the communication network.

Figure 10:
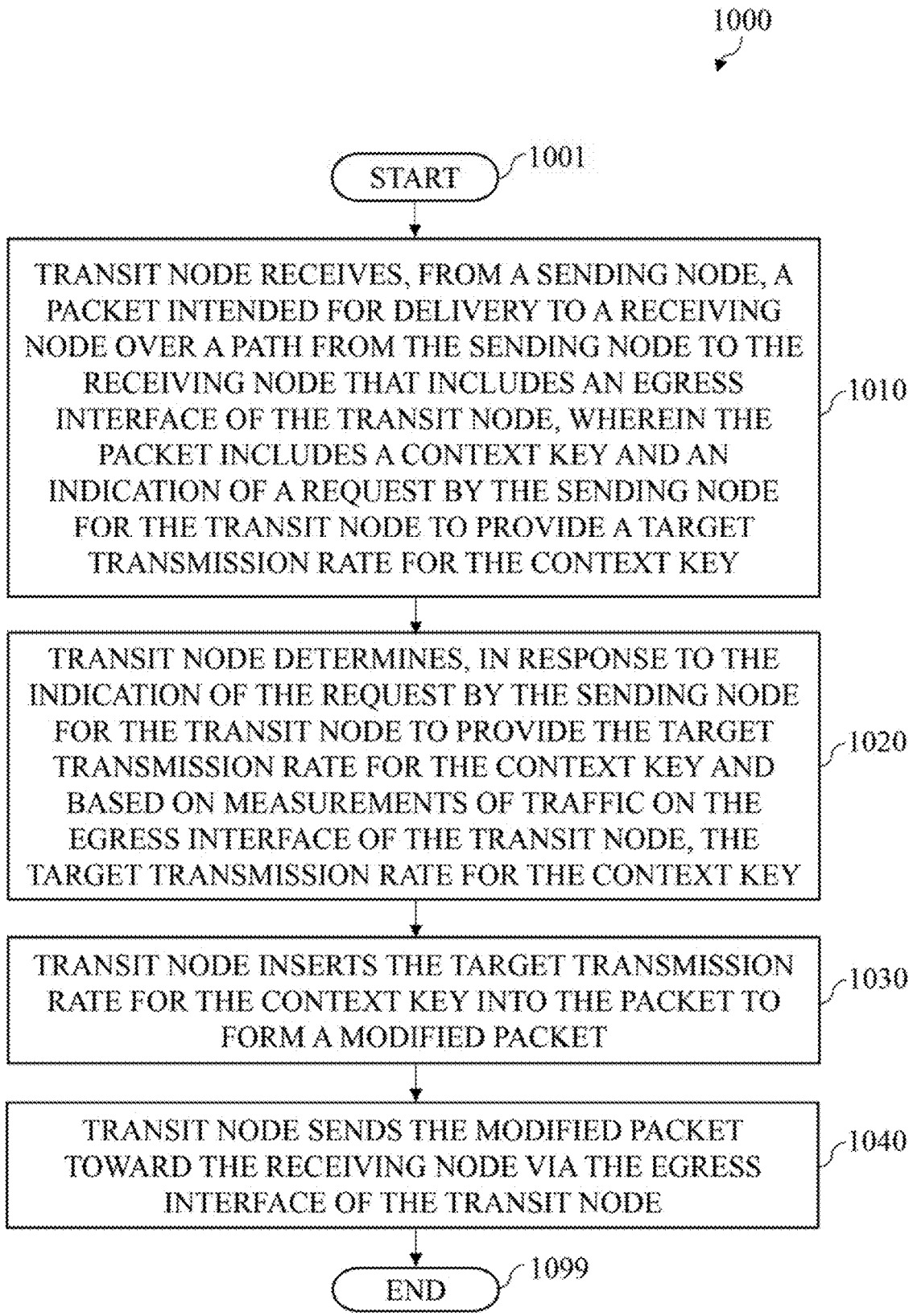
FIG. 10 depicts an example embodiment of a method for use by a transit node to support protocol agnostic cognitive congestion control in a communication network.

FIG. 10 depicts an example embodiment of a method for use by a transit node to support protocol agnostic cognitive congestion control in a communication network. It will be appreciated that, although primarily presented herein as being performed serially, at least a portion of the functions of method 1000 may be performed contemporaneously or in a different order than as presented in FIG. 10. At block 1001, the method 1000 begins. At block 1010, the transit node receives, from a sending node, a packet intended for delivery to a receiving node over a path from the sending node to the receiving node that includes an egress interface of the transit node, wherein the packet includes a context key and an indication of a request by the sending node for the transit node to provide a target transmission rate for the context key. At block 1020, the transit node determines, in response to the indication of the request by the sending node for the transit node to provide the target transmission rate for the context key and based on measurements of traffic on the egress interface of the transit node, the target transmission rate for the context key. At block 1030, the transit node inserts the target transmission rate for the context key into the packet to form a modified packet. At block 1040, the transit node sends the modified packet toward the receiving node via the egress interface of the transit node. At block 1099, the method 1000 ends, although it will be appreciated that transit nodes may be configured to perform various other functions for supporting congestion control in the communication network.

Figure 11:
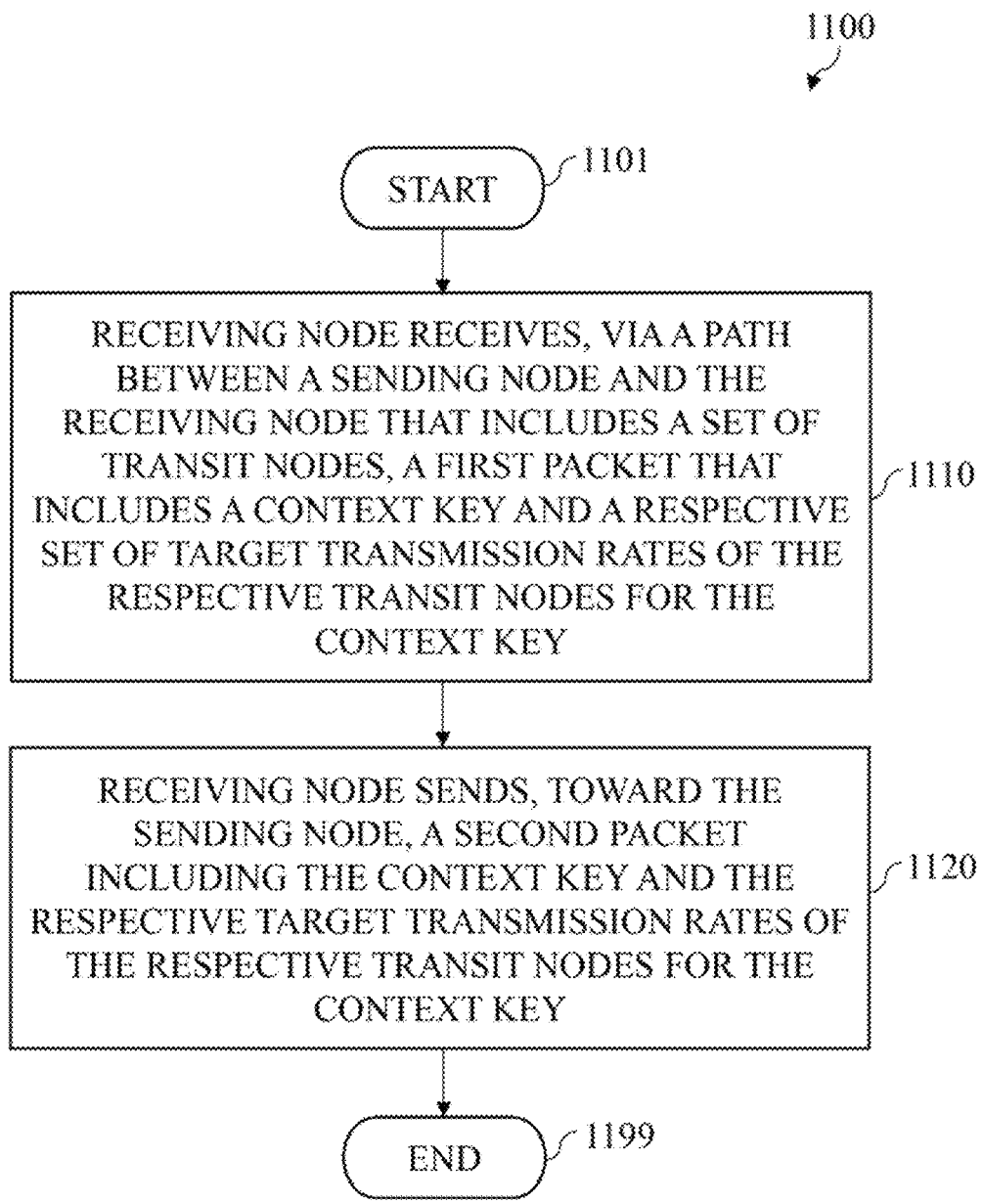
FIG. 11 depicts an example embodiment of a method for use by a receiving node to support protocol agnostic cognitive congestion control in a communication network.

FIG. 11 depicts an example embodiment of a method for use by a receiving node to support protocol agnostic cognitive congestion control in a communication network. It will be appreciated that, although primarily presented herein as being performed serially, at least a portion of the functions of method 1100 may be performed contemporaneously or in a different order than as presented in FIG. 11. At block 1101, the method 1100 begins. At block 1110, the receiving node receives, via a path between a sending node and the receiving node that includes a set of transit nodes, a first packet that includes a context key and a respective set of target transmission rate reports of the respective transit nodes for the context key. At block 1120, the receiving node sends, toward the sending node, a second packet including the context key and the respective target transmission rate reports of the respective transit nodes for the context key. At block 1199, the method 1100 ends, although it will be appreciated that receiving nodes may be configured to perform various other functions for supporting congestion control in the communication network.

Various example embodiments for supporting congestion control in a communication network may provide various advantages or potential advantages. For example, various example embodiments for supporting congestion control in a communication network may be configured to support application of congestion control at L3 of the OSI model, thereby enabling application of the same congestion control algorithm to all L4 protocols including L4 protocols that have native support for congestion control (e.g., TCP, SCTP, QUIC, or the like) and L4 protocols that do not have native support for congestion control (e.g., UDP or the like), although it will be appreciated that different congestion control algorithms may be applied for different L4 protocols. For example, various example embodiments for supporting congestion control in a communication network may be configured such that the speed of reaching the target throughput is only limited by the RTT of the initial message. For example, various example embodiments for supporting congestion control in a communication network may be configured to substantially reduce or even eliminate burstiness of traffic by obviating the need for the senders to try to discover the maximum bandwidth by continuously increasing the transmission rate to the breaking point (e.g., until a packet loss of ECN congestion marking is observed). For example, various example embodiments for supporting congestion control in a communication network may be configured such that, without traffic classification, the algorithm can be effectively implemented immediately in closed network settings such as datacenters, enterprises, single administrator networks, or the like. For example, various example embodiments for supporting congestion control in a communication network may be configured such that, with traffic classification, the algorithm allows the network to operate at optimum load level given the path vector across the network—a load level that takes into consideration the conditions at each node. For example, various example embodiments for supporting congestion control in a communication network, by supporting containment of the algorithmic procedures in the same functional layer (namely. L3), may allow more advanced high-level operations through interactions with other cognitive functions in the network (such as for routing decisions). For example, various example embodiments for supporting congestion control in a communication network may be configured to implement congestion control by connectionless protocols (e.g., IP at L3, Ethernet at L2, or the like) while also covering the needs of higher-level connection-oriented protocols (e.g., TCP or the like). For example, various example embodiments for supporting congestion control in a communication network may be configured to support congestion control while involving the bidirectional associative aspect of a set of flows, without any implications on connection lifecycle control. For example, various example embodiments for supporting congestion control in a communication network may be configured to support more than binary congestion bits for congestion notification by L3 nodes, supporting communication of more detailed congestion information by L3 nodes for use by source nodes in performing L3 congestion control. For example, various example embodiments for supporting congestion control in a communication network may be configured to support more than binary congestion bits for congestion notification, enabling support for identification of specific nodes experiencing congestion, providing statistical information about exactly what congested nodes are experiencing, or the like, as well as various combinations thereof. For example, various example embodiments for supporting congestion control in a communication network may be configured to support congestion control at Layer 3 in a manner that overcomes various limitations generally associated with supporting congestion control at Layer 4, such as by maintaining fairness with other connections (whether or not controlled by the same algorithm), maintaining the ideal average throughput (the "fair share" of the congested link) with minimal fluctuations of the instantaneous throughput around the average, improvements in the time to reach the ideal average throughput after data transmission starts for the connection, finding the right balance between throughput and latency, and so forth. For example, various example embodiments for supporting congestion control in a communication network may be configured to support congestion control by the sending node at Layer 3, without a need for the sending node to try to discover the level of congestion by brute force over a length of time as is typically done for congestion control mechanisms that operate at Layer 4. For example, various example embodiments for supporting congestion control in a communication network may be configured to support congestion control by the sending node at Layer 3, thereby obviating the need for the sending node to run L4 congestion control algorithms separately for each Layer 4 protocol running on the sending node (e.g., TCP, SCTP, QUIC, and/or others) and, thus, enabling each Layer 4 protocol running on the sending node to use simpler mechanisms to send data blocks. For example, various example embodiments for supporting congestion control in a communication network may be configured to take congestion control beyond throughput control on a given path, approaching the problem from a holistic perspective by enabling application of higher-level network functions such as re-routing to resolve congestion. It will be appreciated that various example embodiments for supporting congestion control in a communication network may provide various other advantages or potential advantages.

Figure 12:
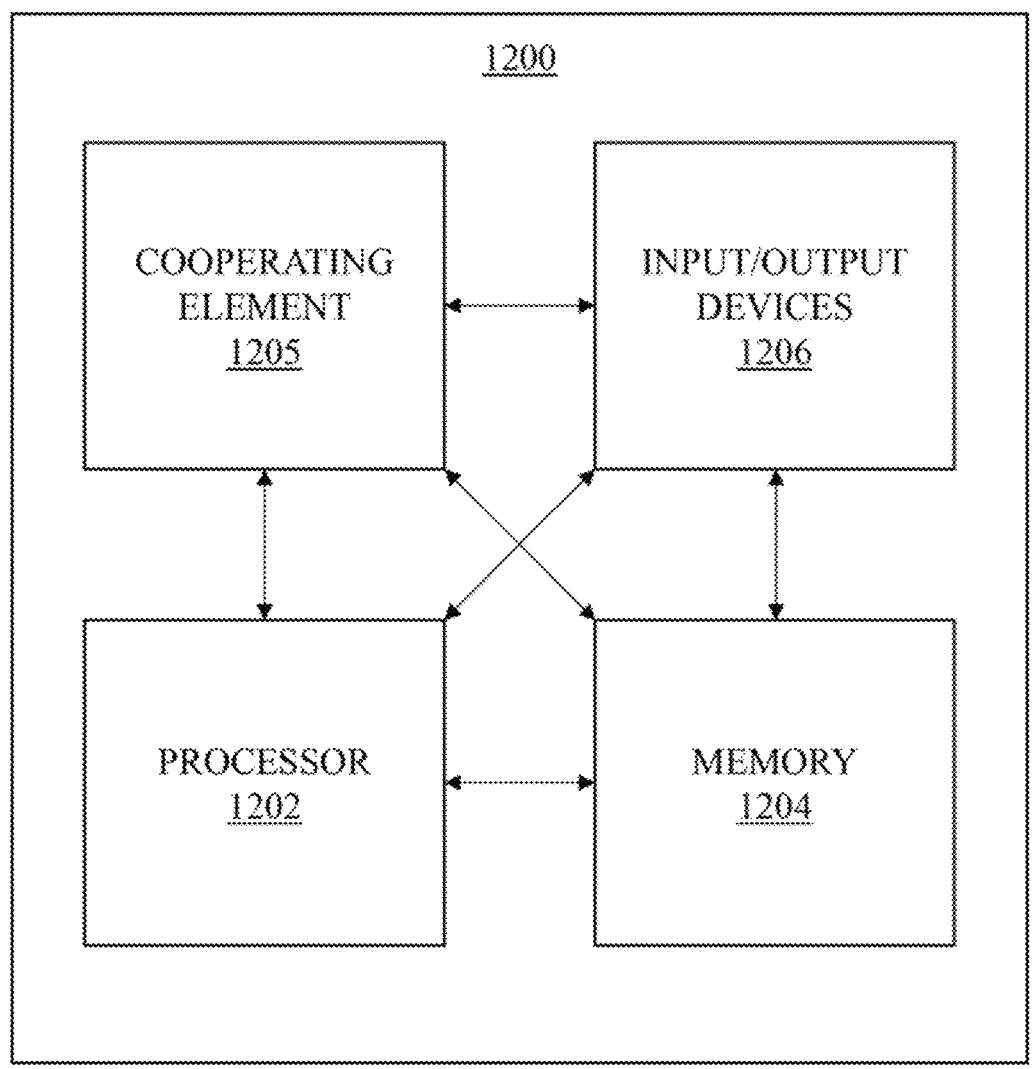
FIG. 12 depicts an example embodiment of a computer suitable for use in performing various functions presented herein.

FIG. 12 depicts an example embodiment of a computer suitable for use in performing various functions presented herein.

The computer 1200 includes a processor 1202 (e.g., a central processing unit (CPU), a processor, a processor having a set of processor cores, a processor core of a processor, or the like) and a memory 1204 (e.g., a random access memory (RAM), a read-only memory (ROM), or the like). In at least some example embodiments, the computer 1200 may include at least one processor and at least one memory storing instructions that, when executed by the at least one processor, cause the computer to perform various functions presented herein.

The computer 1200 also may include a cooperating element 1205. The cooperating element 1205 may be a hardware device. The cooperating element 1205 may be a process that can be loaded into the memory 1204 and executed by the processor 1202 to implement various functions presented herein (in which case, for example, the cooperating element 1205 (including associated data structures) can be stored on a non-transitory computer readable medium, such as a storage device or other suitable type of storage element (e.g., a magnetic drive, an optical drive, or the like)).

The computer 1200 also may include one or more input/output devices 1206. The input/output devices 1206 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1200 may represent a general architecture and functionality suitable for implementing functional elements described herein, portions of functional elements described herein, or the like, as well as various combinations thereof. For example, computer 1200 may provide a general architecture and functionality that is suitable for implementing one or more functions presented herein. For example, computer 1200 may provide a general architecture and functionality suitable for implementing a host or a portion thereof, a node (e.g., a router, a switch, or any other node supporting communication of packets) or a portion thereof, a controller or a portion thereof, or the like.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including instructions that, when executed by the at least one processor, cause the apparatus at least to:
   receive, by a layer 3 protocol handler from a layer 4 protocol handler for a flow to be transmitted over a path between a sending node and a receiving node that includes a set of transit nodes, a protocol data unit of the flow and a context key associated with the flow;
   associate, by the layer 3 protocol handler, the context key with a packet queue storing a set of packets generated based on the protocol data unit;
   determine, by the layer 3 protocol handler for the context key, a minimum target transmission rate associated with the path for the context key, wherein to determine the minimum target transmission rate associated with the path for the context key comprises to send, by the layer 3 protocol handler, a request for each of the transit nodes of the path to provide a respective target transmission rate associated with the path for the context key; and send, by the layer 3 protocol handler based on the minimum target transmission rate associated with the path for the context key, the set of packet.

2. The apparatus of claim 1, wherein the flow belongs to an application session of an application on the sending node.

3. The apparatus of claim 2, wherein the context key uniquely identifies the application session of the application.

4. The apparatus of claim 2, wherein the context key is generated by the application.

5. The apparatus of claim 1, wherein the context key is generated by the layer 4 protocol handler.

6. The apparatus of claim 1, wherein the set of packets is generated by the layer 3 protocol handler from the protocol data unit.

7. The apparatus of claim 1, wherein, to send the request for each of the transit nodes of the path to provide the respective target transmission rate associated with the path for the context key, the instructions, when executed by the at least one processor, cause the apparatus at least to:

include, by the layer 3 protocol handler within a first packet of the set of packets sent via the path, the context key and an indication of the request for each of the transit nodes of the path to provide the respective target transmission rate associated with the path for the context key.

8. The apparatus of claim 1, wherein, to determine the minimum target transmission rate associated with the path, the instructions, when executed by the at least one processor, cause the apparatus at least to:

receive, by the layer 3 protocol handler from the receiving node of the path, a packet including the minimum target transmission rate associated with the path for the context key.

9. The apparatus of claim 1, wherein, to determine the minimum target transmission rate associated with the path, the instructions, when executed by the at least one processor, cause the apparatus at least to:

receive, by the layer 3 protocol handler from the receiving node of the path, a packet including the respective target transmission rates provided by the transit nodes of the path; and select, by the layer 3 protocol handler from the respective target transmission rates provided by the transit nodes of the path, the minimum target transmission rate associated with the path for the context key.

10. A method, comprising:

receiving, by a layer 3 protocol handler from a layer 4 protocol handler for a flow to be transmitted over a path, a protocol data unit of the flow and a context key associated with the flow;

associating, by the layer 3 protocol handler, the context key with a packet queue storing a set of packets generated based on the protocol data unit;

determining, by the layer 3 protocol handler for the context key, a minimum target transmission rate associated with the path for the context key, wherein said determining the minimum target transmission rate associated with the path for the context key comprises sending a request for each of the transit nodes of the path to provide a respective target transmission rate associated with the path for the context key; and sending, by the layer 3 protocol handler based on the minimum target transmission rate associated with the path for the context key, the set of packets.

11. An apparatus, comprising:

at least one processor; and at least one memory including instructions that, when executed by the at least one processor, cause the apparatus at least to:

receive, by a transit node from a sending node, a packet intended for delivery to a receiving node over a path from the sending node to the receiving node that includes an egress interface of the transit node, wherein the packet includes a context key and an indication of a request by the sending node for the transit node to provide a target transmission rate for the context key;

determine, by the transit node in response to the indication of the request by the sending node for the transit node to provide the target transmission rate for the context key and based on measurements of traffic on the egress interface of the transit node, the target transmission rate for the context key, wherein the target transmission rate is indicative of a prediction by the transit node that, when the sending node sends a set of flows associated with the context key at the target transmission rate, buffer delays encountered by the flows at the transit node are not expected to exceed a target buffering delay;

insert, by the transit node, the target transmission rate for the context key into the packet to form a modified packet; and send, by the transit node toward the receiving node via the egress interface of the transit node, the modified packet.

12. The apparatus of claim 11, wherein the target transmission rate for the context key is determined based on a determination that a utilization of a set of egress queues satisfies a target utilization.

13. The apparatus of claim 12, wherein the utilization of the set of egress queues is based on a predicted number of active context flows, a predicted average throughput for the context key, the target transmission rate for the context key, and an egress transmission capacity of the egress interface.

14. The apparatus of claim 12, wherein the target utilization is determined based on use of a probability distribution function related to a probability that a packet is delayed in the set of egress queues.

15. The apparatus of claim 12, wherein the target utilization is determined based on use of at least one function to dynamically compute the target utilization for a given set of criteria for the egress interface of the transit node, wherein the at least one function includes at least one of an artificial intelligence function or a machine learning function.

16. An apparatus, comprising:

at least one processor; and at least one memory including instructions that, when executed by the at least one processor, cause the apparatus at least to:

receive, by a receiving node of a path between a sending node and the receiving node that includes a set of transit nodes, a first packet that includes a context key, a respective set of target transmission rates of the respective transit nodes for the context key, and respective sets of statistical measures provided by the transit nodes for respective egress interfaces of the transit nodes; and send, by the receiving node toward the sending node, a second packet including the context key, the set of target transmission rates of the respective transit nodes for the context key, and the respective sets of statistical measures provided by the transit nodes for respective egress interfaces of the transit nodes.

17. The apparatus of claim 16, wherein the first packet is associated with a flow of an application session of an application on the sending node, wherein the context key uniquely identifies the application session of the application.

* * * * *

UNITED STATES PATENT AND TRADEMARK OFFICE
CERTIFICATE OF CORRECTION

PATENT NO. : 12,199,872 B2
APPLICATION NO. : 18/083768
DATED : January 14, 2025
INVENTOR(S) : Bilgehan Erman et al.

Page 1 of 1

It is certified that error appears in the above-identified patent and that said Letters Patent is hereby corrected as shown below:

In the Claims

In Column 27, Line 5, Claim 1, delete "packet." and insert -- packets. --.

Signed and Sealed this
Twenty-fifth Day of March, 2025

Coke Morgan Stewart
*Acting Director of the United States Patent and Trademark Office*